(12) United States Patent
Phillips

(10) Patent No.: US 10,225,620 B1
(45) Date of Patent: Mar. 5, 2019

(54) SYSTEM AND METHOD FOR EFFECTUATING SELECTIVE ABR SEGMENT DELIVERY FOR ABR BANDWIDTH CONTROL

(71) Applicant: TELEFONAKTIEBOLAGET LM ERICSSON (PUBL), Stockholm (SE)

(72) Inventor: Chris Phillips, Hartwell, GA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/687,170

(22) Filed: Aug. 25, 2017

(51) Int. Cl.
| | |
|---|---|
| H04N 7/16 | (2011.01) |
| H04N 21/647 | (2011.01) |
| H04N 21/2385 | (2011.01) |
| H04N 21/6587 | (2011.01) |

(52) U.S. Cl.
CPC ... *H04N 21/64792* (2013.01); *H04N 21/2385* (2013.01); *H04N 21/64738* (2013.01); *H04N 21/64769* (2013.01); *H04N 21/6587* (2013.01)

(58) Field of Classification Search
CPC ............. H04N 21/2385; H04N 21/64792
See application file for complete search history.

(56) References Cited

U.S. PATENT DOCUMENTS

| | | | | |
|---|---|---|---|---|
| 2007/0133588 | A1* | 6/2007 | Kwon | H04L 47/10 370/431 |
| 2015/0201042 | A1* | 7/2015 | Shah | H04L 65/60 709/219 |
| 2016/0380903 | A1* | 12/2016 | Cai | H04L 12/6418 370/235 |
| 2017/0331914 | A1* | 11/2017 | Loach | H04L 65/80 |

OTHER PUBLICATIONS

Ericsson, "Improving Fairness in HTTP Adaptive streaming", white paper, May 18, 2012; downloaded at http://www.ericsson.com/spotlight/media/blog/improving-fairness-http-adaptive-streaming/.
Ericsson AB, "Network Managed Adaptive Bitrate Video Streaming", white paper by Chris Phillips, Bob Forsman, Kuheli Haldar, Jennifer Reynolds, Paul Stallard, Srinivas Kadaba; Nov. 3, 2015; 17 pages.

* cited by examiner

*Primary Examiner* — Olugbenga O Idowu

(57) ABSTRACT

A scheme for managing bandwidth in a multi-client environment including one or more ABR clients and, optionally, one or more non-ABR clients. When a request for media segments from an ABR client device is detected, the manifest referencing multiple bitrate representations of a media segment is modified wherein references of all but a selected single bitrate representation are removed. The modified manifest referencing the selected single bitrate representation is provided to the ABR client device. Regardless of the selected single bitrate representation referenced in the modified manifest, a particular bitrate representation of the requested media segment determined responsive to a bandwidth allocation mechanism is provided to the ABR client device.

21 Claims, 25 Drawing Sheets

US 10,225,620 B1

SYSTEM AND METHOD FOR EFFECTUATING SELECTIVE ABR SEGMENT DELIVERY FOR ABR BANDWIDTH CONTROL

FIELD OF THE DISCLOSURE

The present disclosure generally relates to communication networks. More particularly, and not by way of any limitation, the present disclosure is directed to a system and method for managing the bandwidth of a communication link, e.g., a delivery pipe, serving one or more adaptive bitrate (ABR) streaming clients of a network environment by effectuating selective ABR segment delivery.

BACKGROUND

With the advent of new technology, e.g., home gateways with multiple tuners and Converged Cable Access Platforms (CCAPs), and the like, managed IP video services are now becoming feasible and cost-effective, in both wireline as well as wireless environments. Also, content delivery networks or CDNs are being developed to distribute various types of content via adaptive bitrate (ABR) streaming. It is known that ABR can result in unfair and sometimes incongruous apportionment of bandwidth in a network based upon the order multiple clients begin to use a network resource. Since the bandwidth usage is typically determined by a client requesting the content, and because the ABR clients can be opportunistic, they may become greedy. Traditional bandwidth management schemes are deficient in a multi-client environment, however, especially where the negative effects of a greedy client become more pronounced in the presence of a duty cycle of another ABR client.

SUMMARY

The present patent disclosure is broadly directed to systems, methods, apparatuses, devices, and associated non-transitory computer-readable media and network architecture for facilitating bandwidth control of a delivery pipe using selective segment delivery. In one aspect, an embodiment of method is disclosed for managing bandwidth of a delivery pipe serving a subscriber premises that includes at least one ABR client device. The claimed embodiment comprises, inter alia, detecting a request for media segments of a content program in an ABR streaming session with the at least one ABR client device. A determination may be made that a dedicated bandwidth is allocated to the ABR streaming session based on a suitable flow control mechanism applied to the delivery pipe. A full bitrate manifest referencing multiple bitrate representations of a media segment requested by the at least one ABR client device is obtained. A particular bitrate representation of the media segment, determined to be within a guard band of the dedicated bandwidth allocated to the ABR streaming session, may be selected for transmission. A modified manifest is generated by removing references of all but a single bitrate representation of the multiple bitrate representations of the media segment from the obtained. The modified manifest referencing the single bitrate representation is provided to the at least one ABR client device. Regardless of the selected single bitrate representation referenced in the modified manifest, the particular bitrate representation of the media segment selected responsive to the guard-banded bandwidth allocation is provided to the at least one ABR client device.

In another aspect, an embodiment of a method is disclosed for accelerating startup of an ABR streaming session effectuated via a delivery pipe serving a subscriber premises that includes at least one ABR client device. The claimed embodiment comprises, inter alia, detecting a request for a new ABR streaming session with the at least one ABR client device. An initial media segment across all bitrate representations referenced in a full ABR manifest obtained for the new ABR streaming session is fragmented, thereby generating a plurality of fragments for each bitrate representation of the initial media segment. In one arrangement, segment fragmentation is effectuated upon determining that the initial media segment comprises a plurality of Instantaneous Decoder Refresh (IDR) frames, wherein each fragment includes at least one IDR frame. The manifest is modified to reference the plurality of fragments for each bitrate representation of the initial media segment. Responsive to a target playout policy corresponding to the at least one ABR client device, a first bitrate representation is determined for transmission to the at least one ABR client device. A new manifest is generated by removing references of all but a selected single bitrate representation of the multiple bitrate representations of the plurality of fragments, whereupon the new manifest is provided to the at least one ABR client device. Regardless of the selected single bitrate representation referenced in the new manifest, the plurality of fragments of the first bitrate representation of the initial media segment are delivered to the at least one ABR client device, whereby the client's buffer may be refilled with enough data in a reduced time for facilitating faster rendering.

In a further aspect, an embodiment of a system, apparatus, or network element is disclosed which comprises, inter alia, suitable hardware such as processors and persistent memory having program instructions for executing an embodiment of the methods set forth herein.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, apparatus, system, network element, subscriber device, and the like, mutatis mutandis. Further features of the various embodiments are as claimed in the dependent claims.

A primary benefit of the present invention is to provide a better utilization of the allocated bandwidth from an ABR bandwidth management system with respect to a video delivery pipe, thereby resulting in an increased QoE to end users watching ABR video. Further, anytime a client must fill/refill its buffer, an embodiment of the present invention may be configured to advantageously reduce the time required for rendering of the video. Skilled artisans will recognize that such buffer (re)fill may be necessitated during initial startup and/or when rewinding or fast forwarding in the video sequence.

Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
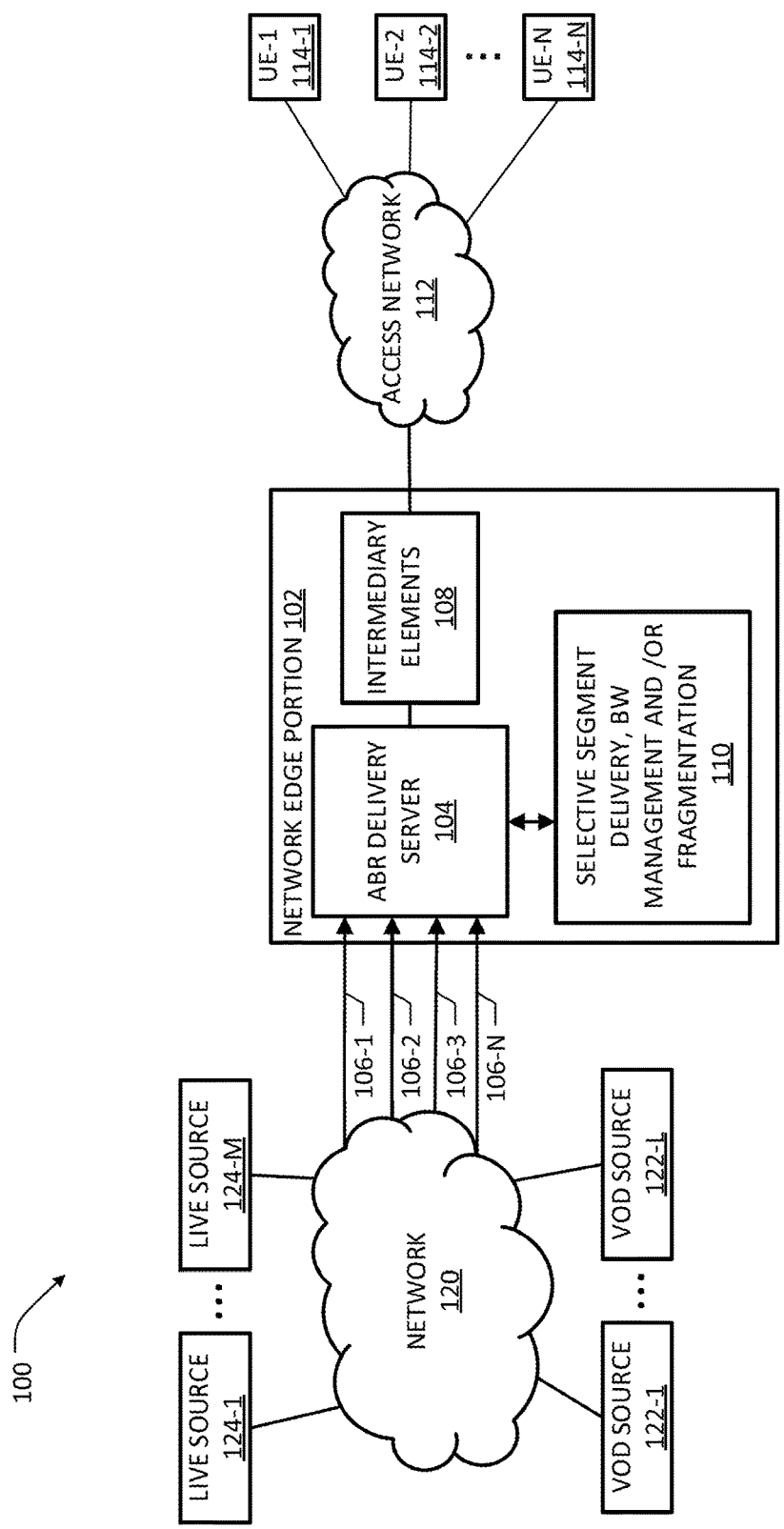
FIG. 1 depicts an example ABR network environment wherein one or more embodiments of the present invention may be practiced for controlling selective segment delivery with respect to streaming a media asset according to the teachings herein.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wired or wireless infrastructure environment involving various types of access networks, technologies, as well as public packet-switched network infrastructures, including or otherwise involving suitable content delivery network (CDN) infrastructure. Accordingly, suitable network elements including one or more embodiments set forth herein may involve terrestrial and/or satellite broadband delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. Some network elements may therefore comprise "multiple services network elements" that provide support for multiple network-based functions (e.g., audio/video (NV) media delivery policy management, session control, QoS policy enforcement, bandwidth scheduling management based on suitable flow control mechanisms (e.g., weighted fair queuing (WFQ) based on phantom payloads), subscriber/device policy and profile management, content provider priority policy management, streaming policy management, and the like), in addition to providing support for multiple application services (e.g., data and multimedia applications). Example subscriber end stations or client devices may comprise various types of user equipment (UE) operative to execute one or more ABR streaming clients (e.g., ABR client devices), tethered or untethered, that may be disposed in one or more subscriber premises. Optionally, some embodiments may also include non-ABR client devices (progressive download client devices, for instance) that share the bandwidth of managed delivery pipes serving the ABR client devices, without departing from the scope of the teachings herein. Illustrative ABR client devices may include any device configured to execute, inter alia, one or more streaming client applications for receiving and rendering content from one or more content providers, e.g., via a broadband access network, and compatible with, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. Such client devices may therefore include set-top boxes (STBs), TVs, personal/digital video recorders (PVR/DVRs), networked media projectors, portable laptops, netbooks, palm tops, tablets, smartphones, mobile/wireless user equipment, portable media players, augmented reality and/or virtual reality (AR/VR) equipment, portable gaming systems or consoles (such as Nintendo®, Wii®, Play Station 3®, etc.) and the like that may access or consume content/services provided via a suitable high speed broadband connection for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example ABR streaming network environment 100 wherein one or more embodiments of the present invention may be practiced for effectuating selective segment delivery in conjunction with bandwidth allocation/management with respect to delivering a media asset (e.g., a content program) to an ABR client device according to the teachings set forth herein. It will be realized that one or more embodiments set forth herein may be advantageously practiced in combination with other bandwidth management techniques, delivery optimization methodologies, etc., for example, responsive to a client's video buffer characteristics, client device/display characteristics and configurations, network/connection conditions, and the like, although it is not necessary that all such features be included in a particular embodiment. In general, the terms "media content," "media asset" or "content file" (or, simply "content" or terms of similar import) as used herein may include stored digital assets or program assets, although the teachings herein are not necessarily limited thereto. Accordingly, a content program may be any type of A/V content that may be delivered using segmentation and streaming, e.g., live capture media or static/stored on-demand media, such as IPTV programs, Over-The-Top (OTT) and Video-On-Demand (VOD) or Movie-On-Demand (MOD) shows or programs, time-shifted TV (TSTV) content, etc. By way of illustration, a plurality of live content sources 124-1 to 124-M and a plurality of static/on-demand content sources 122-1 to 122-L are shown in the ABR streaming environment 100 that exemplify various such content sources. Media content from the content sources may be transmitted via a network 120 (e.g., an IP network using HTTP) as encoded content streams, which may be either segmented or unsegmented (i.e., non-segmented), to an edge network portion 102 (also sometimes referred to as "network edge") serving a plurality of UE devices 114-1 to 114-N. For example, reference numerals 106-1 to 106-N refer to a plurality of ABR segmented VOD streams, ABR segmented live media streams, as well as unsegmented VOD and live streams that are encoded in ABR-friendly manner. Appropriate manifest files with metadata information describing the multiple bitrates used for encoding content at different resolutions and Uniform Resource Locator (URL) pointers of various segments of encoded media content are also provided to the edge network infrastructure 102 for effectuating streaming sessions via an access network 112 that, for example, may be part of a DSL network architecture, a DOCSIS-compliant Cable Modem Termination System (CMTS) network architecture, a mobile telecommunications network architecture, and/or a CDN architecture. Accordingly, suitable intermediate elements such as routers, access multiplexers, CMTS nodes, etc., collectively shown as elements 108, may be provided in association with the network edge 102 for coupling with the access network 112.

Although not specifically shown in FIG. 1, at least a sub-group of UE devices 114-1 to 114-N may be operative as tethered or untethered customer premises equipment (CPE) devices associated with a subscriber premises in one example implementation. Regardless of the type of access network 112 or whether a UE device is part of a subscriber premises, a served UE device is operative as an ABR streaming client (e.g., by executing an ABR client application) that may include one or more suitable media players configured to interoperate with applicable streaming protocols and technologies. As will be set forth in further detail below, an edge network node such as an ABR stream delivery server 104 may be advantageously provided with a selective segment delivery (SSD) mechanism that may be executed in conjunction with a suitable bandwidth management or flow control block for optimizing segment-by-segment delivery of content and/or modulating a bandwidth throttling scheme (e.g., based on one or more WFQ mechanisms or other techniques) with respect to the streaming of a media asset requested by a particular UE device operating as an ABR client. In one arrangement, the ABR stream delivery server 104 may be configured to provide a more optimized streaming service by modulating, modifying, and/or selecting appropriate bitrates of encoded media segments in a manifest (e.g., a master manifest and/or associated child manifests) for respective streaming sessions in response to the flow control criteria determined relative to the respective delivery pipes serving the individual premises or premises within a service group. Furthermore, where additional bandwidth optimization features based on network policy management, user-selected device policy configurations, UE device decoding/display capabilities, operator-supplied policies, etc., are implemented, it should be appreciated that appropriate service logic for bitrate/segment selection may be provided at a network level in combination with additional delivery management policies in an embodiment of the present disclosure. In such an arrangement, because the network node (e.g., ABR delivery server 104) has a broader awareness of the overall network conditions (e.g., upstream/north-bound and/or downstream/south-bound conditions) as well as respective UE devices' video player/buffer performance, a more consistent service quality may be achieved throughout the network.

In a further aspect, a re-segmentation or re-fragmentation mechanism may also be provided in conjunction with the ABR stream delivery server 104 for dynamically re-segmenting an incoming media content stream at appropriate locations, e.g., based on stream access points (SAPs) and/or associated timing information, e.g., presentation and decoding timestamps (i.e., PTSs/DTSs), etc., into sub-segments or fragments that may be utilized in an embodiment of the present invention in order to facilitate a fast ABR startup when a media asset is requested, as will be set forth in further detail below.

Figure 2:
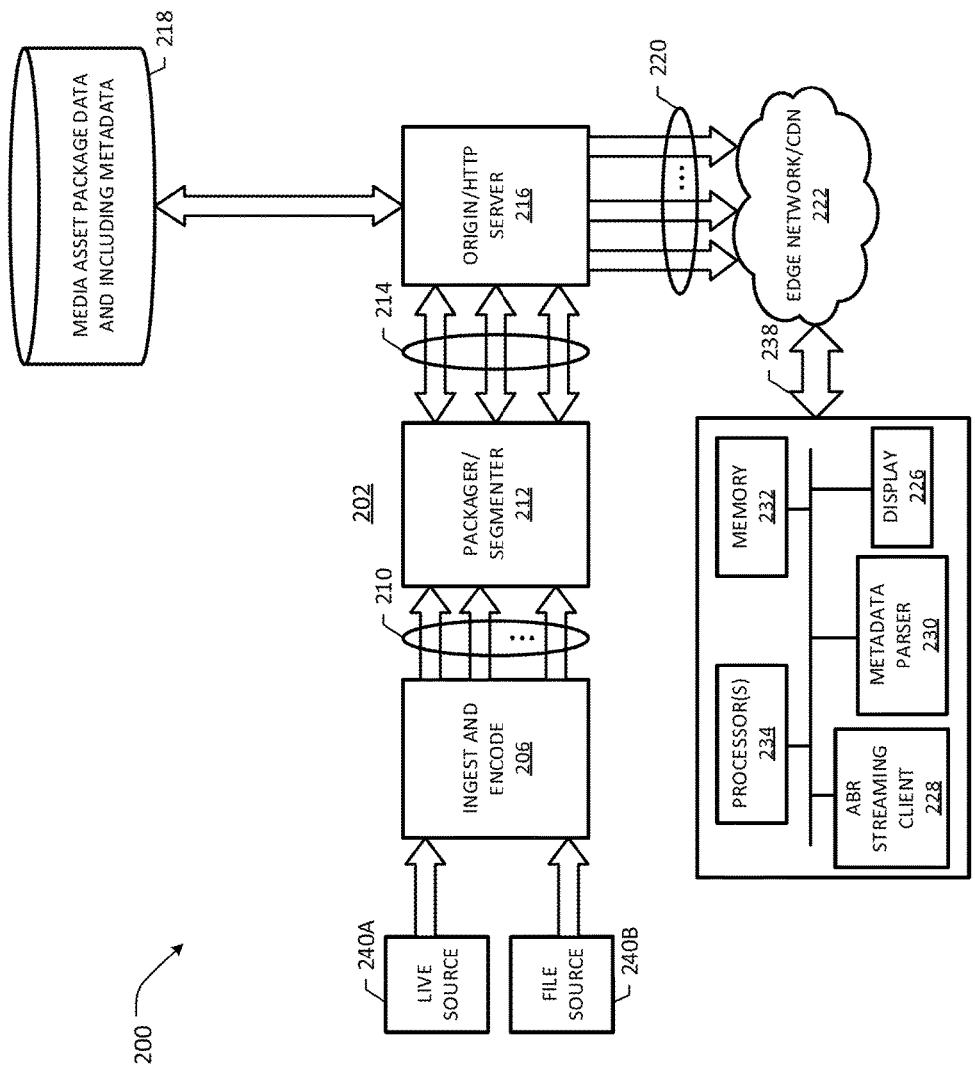
FIG. 2 depicts another aspect of an example ABR network environment with additional elements illustrated according to an embodiment.

FIG. 2 depicts another aspect of an example ABR network environment 200 with additional elements for purposes of one or more embodiments of the present disclosure, wherein an edge network and/or an overlay content delivery network or content distribution network (CDN) 222 coupled to a source network infrastructure 202 is illustrated. In one implementation, CDN 222 may comprise a delivery architecture over a public or private packet-switched network (e.g., the Internet) for facilitating high-performance streaming of a variety of media assets or program assets to an example ABR client device or UE device 224. It will be apparent that one or more such client devices may be associated with a subscriber/customer for consuming content delivered via CDN 222 in any type or number of access technologies including broadband access via wired and/or wireless (radio) communications configured to support a managed bandwidth delivery pipe to the subscriber premises or subscriber service groups.

Source network portion 202 may be configured to accept media content from live sources 204A and static file sources 204B at an ingest/encode block 206, wherein the source content may be encoded using one or more type(s) of source video codecs (e.g., H.264, MPEG varieties, High Efficiency Video Coding or HEVC (H.265), and the like). Where an input media stream is already encoded or compressed, block 206 may be configured to operate as a transcoder so that one or more ABR representations of the media content at suitable bitrates may be generated. In general operation, an example streaming content server system 202 may be configured, under the control of one or more processors executing appropriate program code stored in a persistent memory module (not specifically shown), to effectuate adaptive streaming of content as follows. Initially, source media content is transcoded or otherwise encoded with different bit rates (e.g., multi-rate transcoding) using applicable encoder(s) 206. For example, content of a particular media asset may be transcoded into five video files using variable bit rates (or, synonymously "bitrates" or "representations"), ranging from low to high bit rates (500 Kbps to 10 Mbps, by way of illustration). The particular content is therefore encoded as five different "versions" or "formats", wherein each bitrate is called a profile or representation, indicative of different video qualities (e.g., standard definition or SD, high definition or HD, ultra HD or UHD etc.). Reference numeral 210 refers to a collection of media streams encoded at different bitrates by the encoder 206. A segmentation/packager 212 is operative to divide each version of the encoded media content into fixed duration segments or chunks, which may be between two and ten seconds in duration, thereby generating a plurality of chunk streams 214. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same media segment data with properly aligned timing boundaries. One or more suitable metadata files referred to as manifest files are created that describe the encoding rates and Uniform Resource Locator (URL) pointers for the various segments of encoded content. An origin/HTTP server 216 associated with a CDN is operative to receive the encoded media streams 214 as well as associated manifest files, which may be stored at a database 218, for facilitating adaptive delivery of the media to the requesting clients 224 via edge/CDN 220, illustrated as adaptive streams 220.

For purposes of the present patent application, the terms "streaming client device", "client device", or "ABR device", or terms of similar import may be used synonymously and may comprise any UE device or appliance that in one implementation not only receives program assets for live viewing, playback and/or decoding the content, but also operates as a command console or terminal that can accept user inputs, messages, commands or requests to interact with a network element disposed in edge/CDN 222 and/or associated streaming server systems for controlling transmission of content via a bidirectional interface. By way of illustration, the example client device 224 may include one or more streaming client modules 228 (e.g., an ABR streaming client) and associated decoding functionalities depending on the streaming technologies implemented (e.g., HLS, MPEG-DASH, etc.) as well as a metadata parser module 230 operative to parse the manifest files received via a communication interface 238 to the IP/CDN 222 for selecting a suitable bitrate to optimize the segment media quality. The streaming client module(s) 228 and the metadata parser module 230 are operably coupled to one or more processors 234 and memory module(s) 232 via a suitable bus structure 236 for effectuating acquisition, decoding and rendering of the streamed media content, e.g., at a display 226. Although not separately shown, memory 232 is illustrative at least of a video buffer memory as well as one or more persistent memory modules containing program instructions for execution by the processors 234 in order to effectuate one or more client-controlled segment-delivery processes set forth in additional detail further below. The ABR client device 224 may also include appropriate user interfaces for viewing one or more electronic program guides that list, identify or otherwise show various streaming channels (live media and/or on-demand) the subscriber is able to receive. Such user interfaces may also be configured to allow the user to scroll through an electronic program guide (i.e., channel surfing), select or otherwise change a particular streaming channel, and the like.

Figure 3:
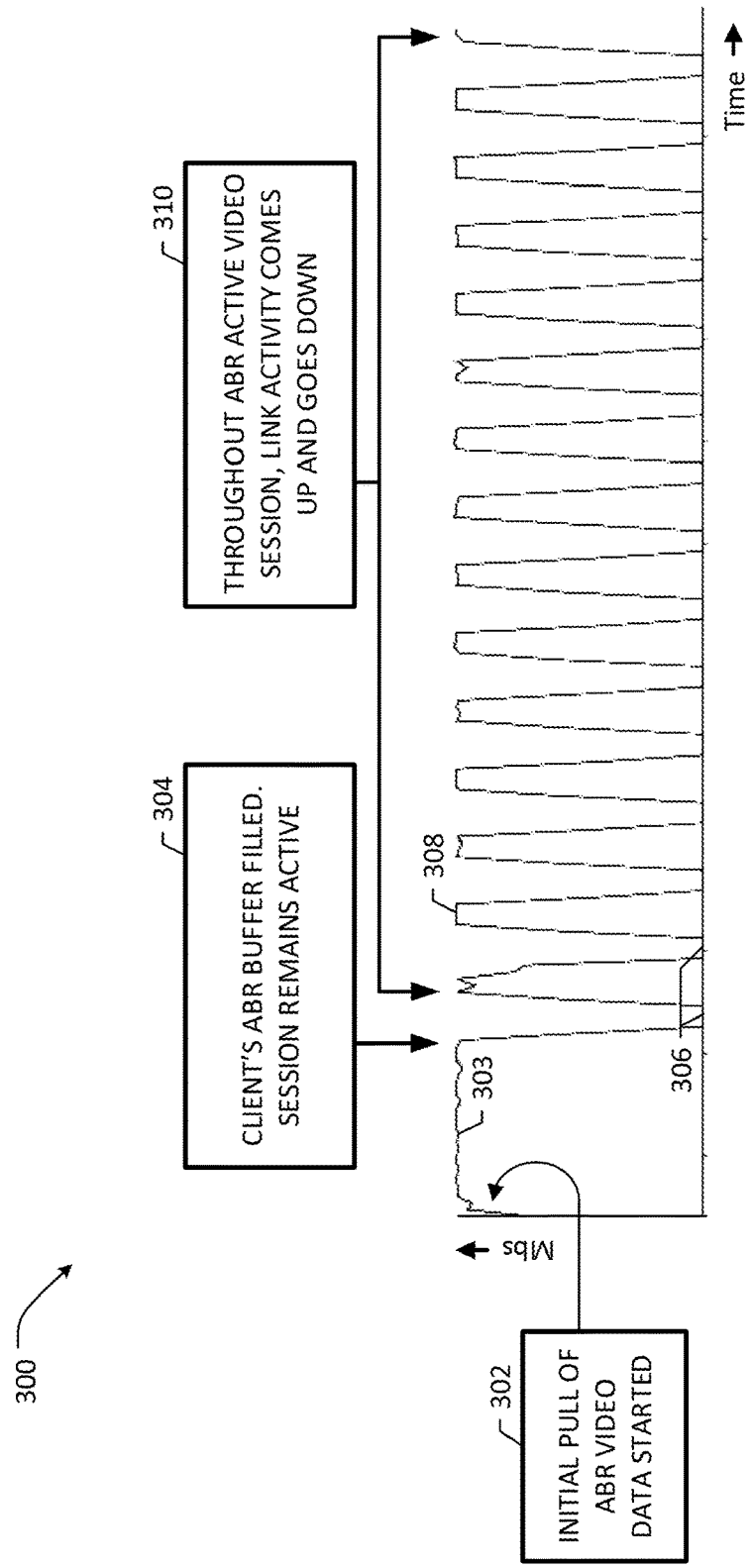
FIG. 3 depicts an embodiment of duty cycle behavior with respect to an example UE device's ABR media player.

As pointed out previously, ABR clients can be opportunistic and may become greedy, thereby affecting the overall quality of video delivery in a multi-client environment. In particular, traditional bandwidth management schemes may be "tricked" by duty cycles of ABR clients into overestimating available bandwidth, which may cause an opportunistic client to attempt to obtain higher bitrate content although the so-called additional bandwidth is seen only during the inactive phases (e.g., sleep phases) of the duty cycle. Typical ABR clients are configured to download ABR content in bursts, filling their buffer and then resting until more content is needed, which results in duty cycles that may vary from client to client. Further, the ABR clients may be configured to choose their own bitrate for downloading content based on network conditions. For purposes of one or more embodiments of the present disclosure, a duty cycle may be defined as a sequence of the intervals of an ABR client downloading until it fills its buffer, and then resting until the buffer is drained by a predetermined amount, e.g., due to completing the playout of a video segment. Referring to FIG. 3, depicted therein is an embodiment of an ABR client's duty cycle behavior as a graphical representation 300. In general, the ABR client begins to fill its buffer as hard as it can during initial startup phase 302 until it reaches a maximum capacity allowed under the network conditions (e.g., capped to a certain megabits/second of the managed delivery pipe such as 2 Mbs, 4 Mbs, 6 Mbs, etc.), as exemplified by trace portion 303. As the content segments are being downloaded into the client's buffer, their size and number may be monitored or otherwise tracked. The client may begin rendering/playout as soon as it can, and after a certain period of time, the ongoing action of downloading results in reaching a maximum buffer capacity. Accordingly, until the buffer is full, the session remains active (block 304), and the client's duty cycle may commence thereafter. While a segment is being played out of its buffer, the client may enter into a temporary inactive, or sleep, phase 306. When the playback of the segment is completed, the client (re)enters an active, or awake, phase 308, for pulling or downloading another block of content (e.g., the next segment) from the network so as to maintain the buffer capacity. This sequence or pattern of alternating active and sleep phases continues for the entire video session until a control action (e.g., pause, trick mode navigation, stop, etc.) takes place. It should be appreciated that throughout the ABR active video session, link activity (e.g., wired or wireless) comes up and goes down (i.e., oscillates) as set forth in block 310.

Skilled artisans will recognize that an ABR client that begins to download a segment during a resting period of other ABR clients may discover that it has a lot of extra bandwidth available, even though on average the bandwidth pipe may be fully utilized. If that ABR client ramps up its bitrate to a higher quality and starts to download segments encoded at higher bitrate(s), it may soon encounter a situation where one or more of other ABR clients become active in accordance with their respective duty cycles and start downloading content. In such conditions, the first ABR client trying to maximize its video quality under the perceived increase in available bandwidth may in fact be forced to adapt to a lower bandwidth condition, thereby decreasing the video quality rapidly. Because multiple clients may be actively engaged in respective video sessions at any time, wherein each client may exhibit a duty cycle specific to its own performance characteristics, the duty cycles in a multi-client environment (e.g., a subscriber premises or groups of premises served by a broadband delivery pipe or a base station serving a plurality of mobile clients) may be asynchronous to one another, with highly unpredictable occurrences of peaks (active phases) and valleys (sleep phases) with respect to any particular ABR client. Accordingly, an ABR client that tries to preemptively/proactively increase its bandwidth consumption (e.g., by requesting higher bitrate segments) during the resting period(s) of the other clients may experience rapid variation in its video quality (high to low and low to high), potentially oscillating in a ping-pong fashion between extremes of quality (i.e., QoS "thrashing"), thereby resulting in unsatisfactory user experience. Furthermore, one skilled in the art should recognize that such quality concerns may become even more aggravated when multiple clients having different priorities, weights, and policies come on line at varying times in a serving network, thereby dynamically—and often quite unpredictably—changing the network conditions.

As will be seen below, example embodiments of the present invention may be configured to provide appropriate control signals to disable, deactivate, or otherwise render the segment bitrate selection capability of a UE device inoperative such that the UE device's selfish ABR behavior described above may be advantageously circumvented. Broadly, by suppressing the UE device's segment bitrate selection functionality, a single bitrate representation of a requested media asset may be signaled to the UE device by modifying a manifest file wherein the single bitrate representation may be optimized within a flow control mechanism implemented for allocating the bandwidth across multiple UE devices in a managed delivery pipe.

Skilled artisans will recognize upon reference hereto that the bandwidth of a managed delivery pipe serving an individual subscriber's premises (e.g., in a DSL implementation) or a service group of multiple subscribers (e.g., in a DOCIS/CMTS implementation) may be managed and allocated using a number of flow control mechanisms (e.g., fair queuing, round robin, weighed round robin, priority queuing, weighted fair queuing, etc.). By way of example, a particular flow control mechanism based on weighed fair queuing that involves what may be referred to as "phantom packets" is set forth below, although the disclosed embodiments herein are not necessarily limited thereto.

Figure 5A:
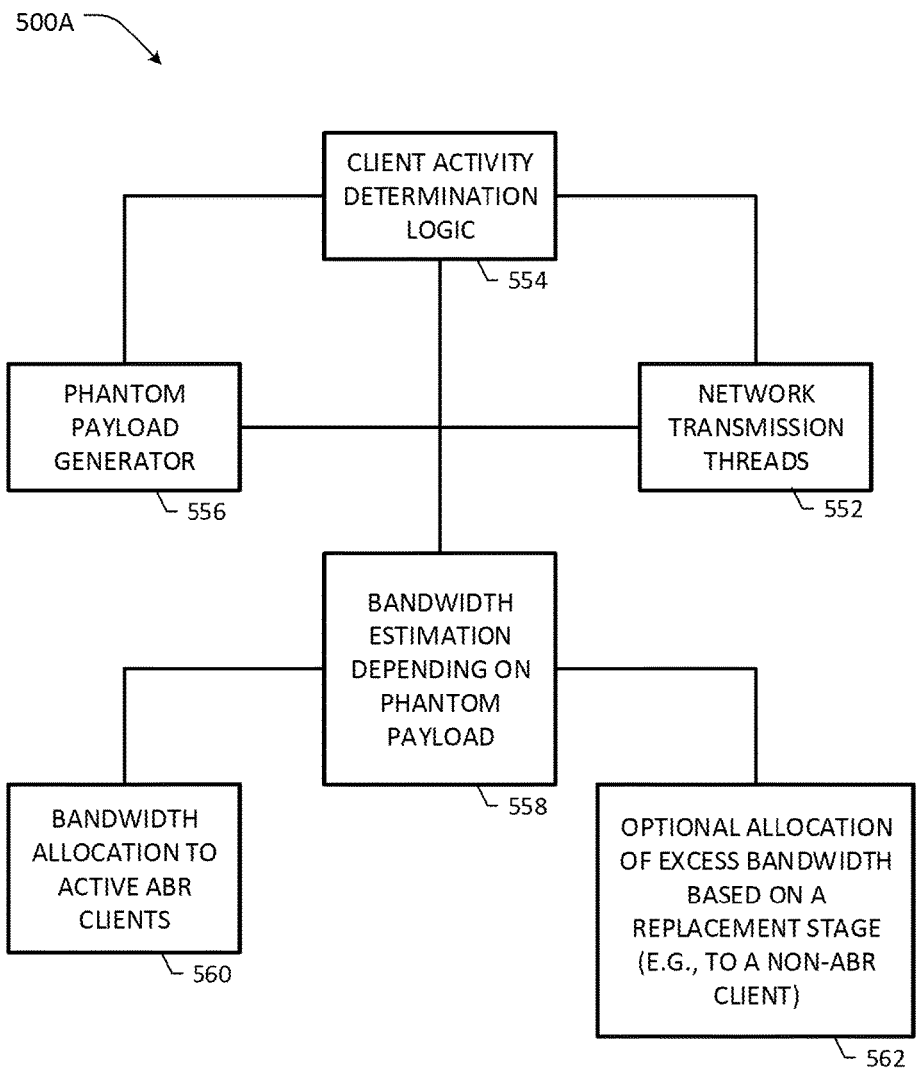
FIG. 5A depicts is an example bandwidth management and transmission control mechanism (i.e., flow control) involving phantom packet payloads that may be implemented for purposes of an embodiment of the present patent application.
Figure 5B:
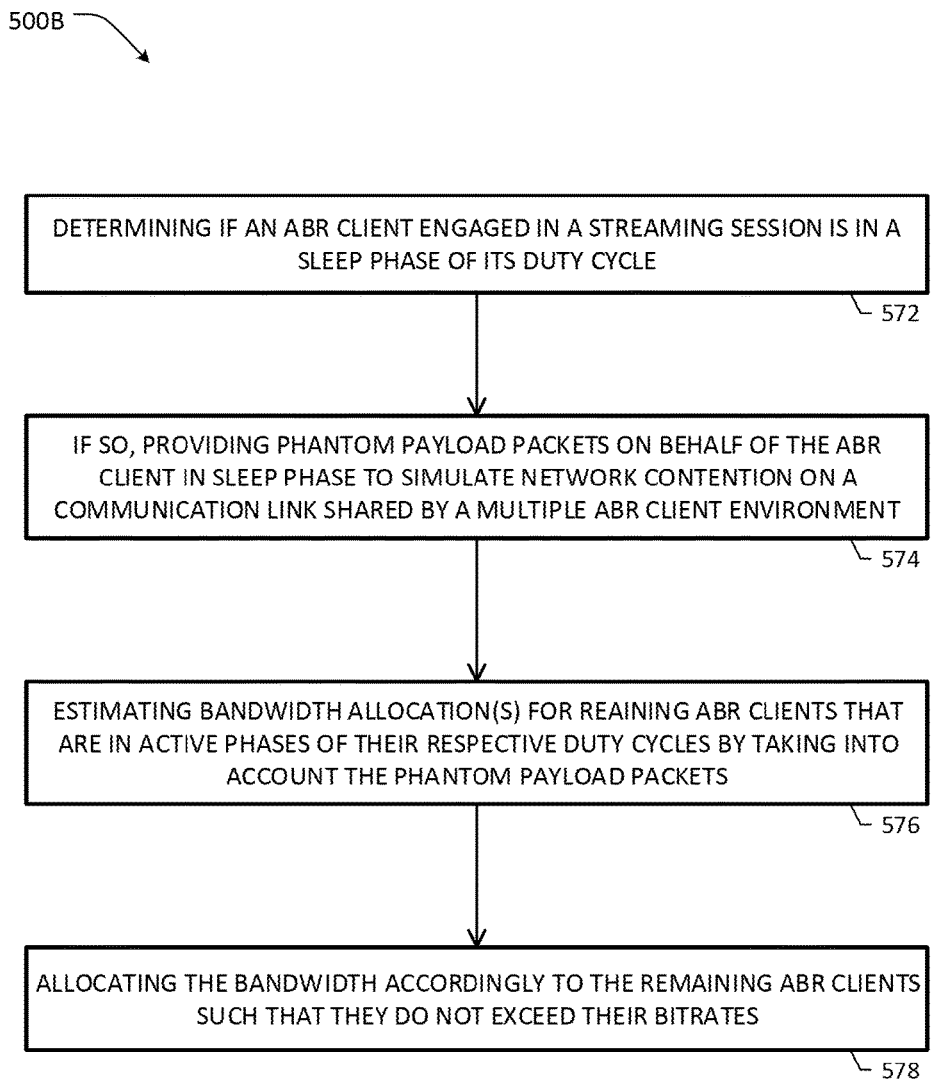
FIG. 5B is a flowchart relative to the example bandwidth management and transmission control mechanism illustrated in FIG. 5A.

Turning to FIG. 5A, depicted therein is an example bandwidth management and transmission control mechanism (i.e., flow control) involving phantom payloads that may be implemented for purposes of an embodiment of the present patent application. Relatedly, FIG. 5B illustrates a flowchart with respect to the example bandwidth management and transmission control mechanism 500A depicted in FIG. 5A. In one arrangement, system 500A may be configured to operate as part of or otherwise be associated with a network node disposed in an edge distribution network associated with a DSL architecture, DOCSIS/CMTS architecture, or a CDN architecture, wherein a subscriber premises (e.g., home, office, building, campus, organization, etc.) having a plurality of client devices is served by an incoming broadband delivery pipe. In another implementation, system 500A may be configured to operate at a premises element, e.g., a DSL gateway or a cable modem, associated with the subscriber premises. In a still further implementation, system 500A may be provided in association with a radio network controller (RNC) operative to effectuate a broadband backhaul link to a base station for effectuating content delivery to a plurality of mobile clients served by the base station in a mobile telecommunications network.

In general operation, system 500A advantageously incorporates a client activity determination logic process or module 554 that is operative to determine when an ABR client is in a sleep phase of its duty cycle, whereupon a certain amount of phantom payload packets may be generated to simulate the network contention on a communication link shared by a plurality of ABR clients. In order to differentiate legitimate sleep phases of the ABR duty cycle from extended periods of inactivity, a timer mechanism may be provided in conjunction with the client activity determination logic module 554. For example, if an ABR client has stopped playing, or lost connectivity (wired or wireless), paused, or the user walked out of a subscriber premises or roamed out of a coverage area (in a mobile environment), the client activity determination module 554 is operative to differentiate such an inactive period and send appropriate control signals to deactivate a phantom payload generation module or process 556. Phantom packet loads (basically, blocks of transmission slots corresponding to certain amount of data, e.g., 2 kilobytes, 4 kilobytes, etc.) may be provided pursuant to "phantom tokens", which are requests for permission to transmit phantom packets, issued in respect of a network transmission thread (NTT) 552 that corresponds to an ABR client in sleep mode. When such phantom payload packets are generated, a bandwidth estimation module 558 is operative to account for the phantom payload information in estimating bandwidth allocations for other ABR clients having corresponding NTTs 552 in a multi-client environment that are not in their respective sleep phases. Because the remaining ABR clients are denied the opportunity to "hog" the extra bandwidth as per the bandwidth allocation process 560, they are forced into their respective bitrates for the duration of streaming sessions ("bitrate locking"). Optionally, any excess bandwidth may be allocated to a non-ABR client (where the multi-client environment includes one or more non-ABR clients) based on a replacement stage, if such a stage is selected or otherwise activated, which is provided as optional replacement stage block 562 of the system 500A.

Process 500B of FIG. 2B is exemplary of a mechanism where phantom payload is provided for estimating network contention at full capacity and thereby mitigating the greedy behavior of ABR clients in a multi-client arrangement. At block 572, a determination is made if an ABR client engaged in a streaming session is in a sleep phase of its duty cycle. If so, an appropriate amount of phantom payload packets are provided on behalf of the ABR client in sleep phase to simulate, emulate or otherwise mimic network contention on a communication link shared by multiple ABR clients (block 574). At block 576, bandwidth allocation(s) to one or more remaining ABR clients that are active are estimated, preferably by taking into account the phantom payload packets. Skilled artisans will recognize that there are no packets actually put on the wire during the phantom payload phase. Rather, the simulated packet payload is provided for purposes of bandwidth allocation using a suitable technique such as WFQ. Thereafter, the bandwidth is allocated accordingly to the remaining ABR clients such that they do not exceed their bitrates (block 578). Additional details with respect to allocating bandwidth of a distribution pipe based on weights and priority levels associated with subscriber devices, content-based policies, dynamic resizing of the pipes using, e.g., one or more pipe control nodes, and scheduling based on WFQ techniques, as well as phantom payload-based WFQing may be found in one or more of the following commonly owned U.S. patent application(s) and/or patents: (i) "SYSTEM AND METHOD FOR MANAGING BANDWIDTH RESPONSIVE TO THE DUTY CYCLE OF AN ABR CLIENT", application Ser. No. 14/618,295, filed Feb. 10, 2015, in the name(s) of Chris Phillips, et al., issued as U.S. Pat. No. 9,467,387; (ii) "SYSTEM AND METHOD FOR MANAGING BANDWIDTH RESPONSIVE TO THE DUTY CYCLE OF AN ABR CLIENT", application Ser. No. 14/618,391, filed Feb. 10, 2015, in the name(s) of Chris Phillips, et al., published as U.S. Patent Application Publication No. 2016/0234126; (iii) "REGULATING CONTENT STREAMS FROM A WEIGHTED FAIR QUEUING SCHEDULER USING WEIGHTS DEFINED FOR USER EQUIPMENT DEVICES", application Ser. No. 13/597,333, filed Aug. 29, 2012, in the name(s) of Charles Dasher et al., issued U.S. Pat. No. 9,100,464; (iv) "METHODS AND APPARATUS FOR MANAGING NETWORK RESOURCES USED BY MULTIMEDIA STREAMS IN A VIRTUAL PIPE", application Ser. No. 14/013,479, filed Aug. 29, 2013, in the name(s) of Robert Forsman et al., published as U.S. Patent Application Publication No. 2013/0346568; and (v) "METHODS AND APPARATUS FOR MANAGING NETWORK RESOURCES USED BY MULTIMEDIA STREAMS IN A VIRTUAL PIPE", application Ser. No. 13/403,075, filed Feb. 23, 2012, in the name(s) of Robert Forsman et al., issued as U.S. Pat. No. 8,549,570, which are incorporated by reference herein.

Figure 4:
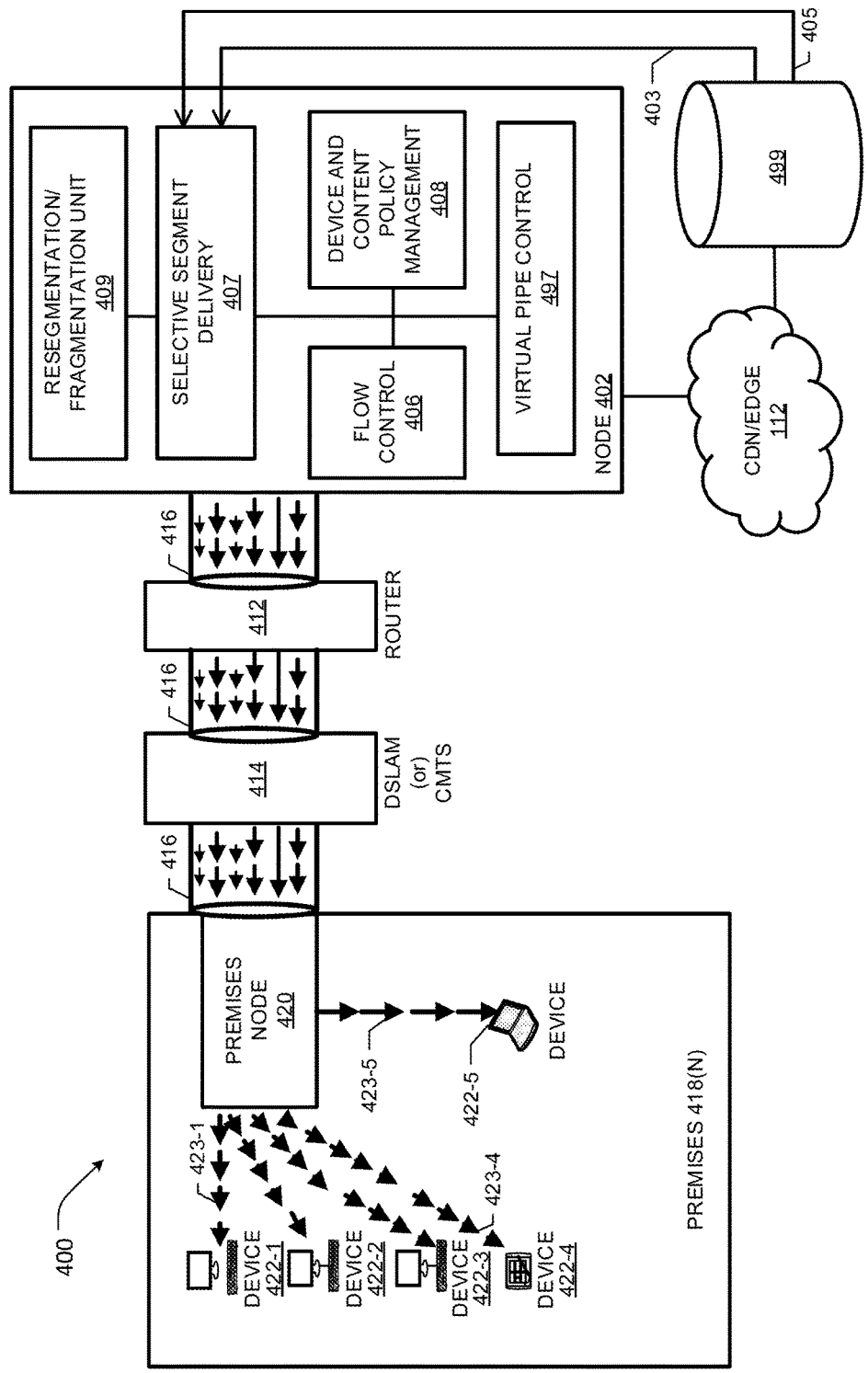
FIG. 4 depicts a portion of an example ABR streaming network wherein a flow control and selective segment delivery mechanism may provided according to an embodiment of the present invention.

Taking reference to FIG. 4, depicted therein is an example ABR streaming network 400 with further details regarding a network node where a flow control and selective segment delivery mechanism may provided according to an embodiment of the present invention. Skilled artisans will recognize that node 402 may be implemented in one arrangement as an ABR bandwidth management element disposed in a CDN/edge network portion 404 having a media asset storage unit 499 associated therewith, wherein media segments for various content programs as well as manifest files containing references to the segments in all ABR bitrate representations (e.g., full ABR manifests) may be cached. A phantom packet-based WFQ flow control mechanism 406 may be included to facilitate appropriate transmission flow control and bandwidth allocation with respect to a delivery pipe 416 effectuated via suitable infrastructure elements such as a router 412 and DSLAM or CMTS 414 (depending on whether DSL or DOCSIS infrastructure is implemented). A device and content policy management element 408 may also be provided for facilitating further control with respect to device weights/priorities, content-based policies, subscriber policies, etc. In a further variation, a (re)segmentation/(re)fragmentation unit 409 may be optionally provided for effectuating fast ABR startup, which will be described in detail further below, in conjunction with a selective segment delivery mechanism 407 that may be configured to operate in a substantially similar manner regardless of whether a DSL or DOCSIS architecture is implemented.

With respect to the embodiments of the present patent application, it will be noted that a major difference between the DSL and DOCSIS architectures is how the bandwidth management may be applied. In the case of the DSL network, there is a single fixed sized pipe at the edge of the DSL network that is defined based on the size of the pipe to a subscriber home, e.g., premises 418(N). In a DOCSIS network, the bandwidth is shared across all homes of a service group. Accordingly, in the case of DOCSIS network implementation, there is an outer pipe defined for ABR traffic covering either all service groups serviced by the CMTS node 414 or multiple virtual pipes per service group. For example, a DSL implementation may involve a virtual pipe of 15 Mbs serving subscriber premises 418(N) containing a plurality of devices 422-1 to 422-5 engaged in respective ABR streaming sessions, 423-1 to 423-5, each having a specific bandwidth allocated based on a suitable flow control mechanism. On the other hand, an outer pipe sized at 2 Gbs for ABR delivery to all homes served by the CMTS (e.g., in one or more service groups) may be provided in an example DOCSIS/CMTS implementation, wherein a plurality of inner pipes and sub-pipes are effectuated for servicing individual subscriber premises and respective ABR devices. The inner pipes may dynamically increase or decrease in size based on the ABR bandwidth usage by each of the homes 418(N) in the service group, which may result in the pipes being resized resulting in a dynamic changing of bandwidth allocated to the flows inside of each of the pipes. As one skilled in art will appreciate, the bandwidth allocation across the outer pipe may therefore be dynamically varied depending on the bandwidth usage across all of the homes being served by the CMTS element 414.

In view of the fact that the selective segment delivery mechanism 407 may be configured to operate in a similar manner regardless of the underlying access network infrastructure, embodiments of the present invention will be set forth below in an architecture-agnostic fashion unless otherwise specifically noted with respect to a particular implementation, mutatis mutandis. In general, the ABR selective segment delivery (SSD) component 407 may be configured to interface with the flow control module 406 as well as a virtual pipe control module 497 to retrieve the allocated bandwidth for all ABR active sessions. SSD 407 is also operative to request, receive or otherwise obtain the full ABR manifest for a requested ABR package from network storage or CDN delivery node 499. The full ABR manifest includes references to all bitrate representations of the requested media segments (e.g., 400 Kbs to 10 Mbs), which may be modified by SSD 407 to optimize the proper segment to deliver to the requesting ABR client. The manifest is stripped of all bitrates except for any one (e.g., it could be the highest bitrate, lowest bitrate or any other bitrate referenced in the full ABR manifest), which may be delivered to the ABR client. By removing all bitrates from the manifest except for one, the ABR client's bandwidth estimation and segment choices are effectively removed. In other words, the ABR client is forced into receiving a segment encoded at a select bitrate that ABR bandwidth management node 402 has selected based on optimizing the bandwidth allocation across the delivery pipe. If this was not done, the ABR client would be tricked in its bandwidth estimation logic if a different bitrate segment than the requested segment was delivered. Accordingly, it will be appreciated that a single bitrate manifest may be provided to the ABR client in an embodiment of the present invention as a signaling mechanism to deactivate or otherwise incapacitate the ABR client's bandwidth estimation logic while forcing delivery of a particular bitrate segment to the ABR client.

Figure 6A:
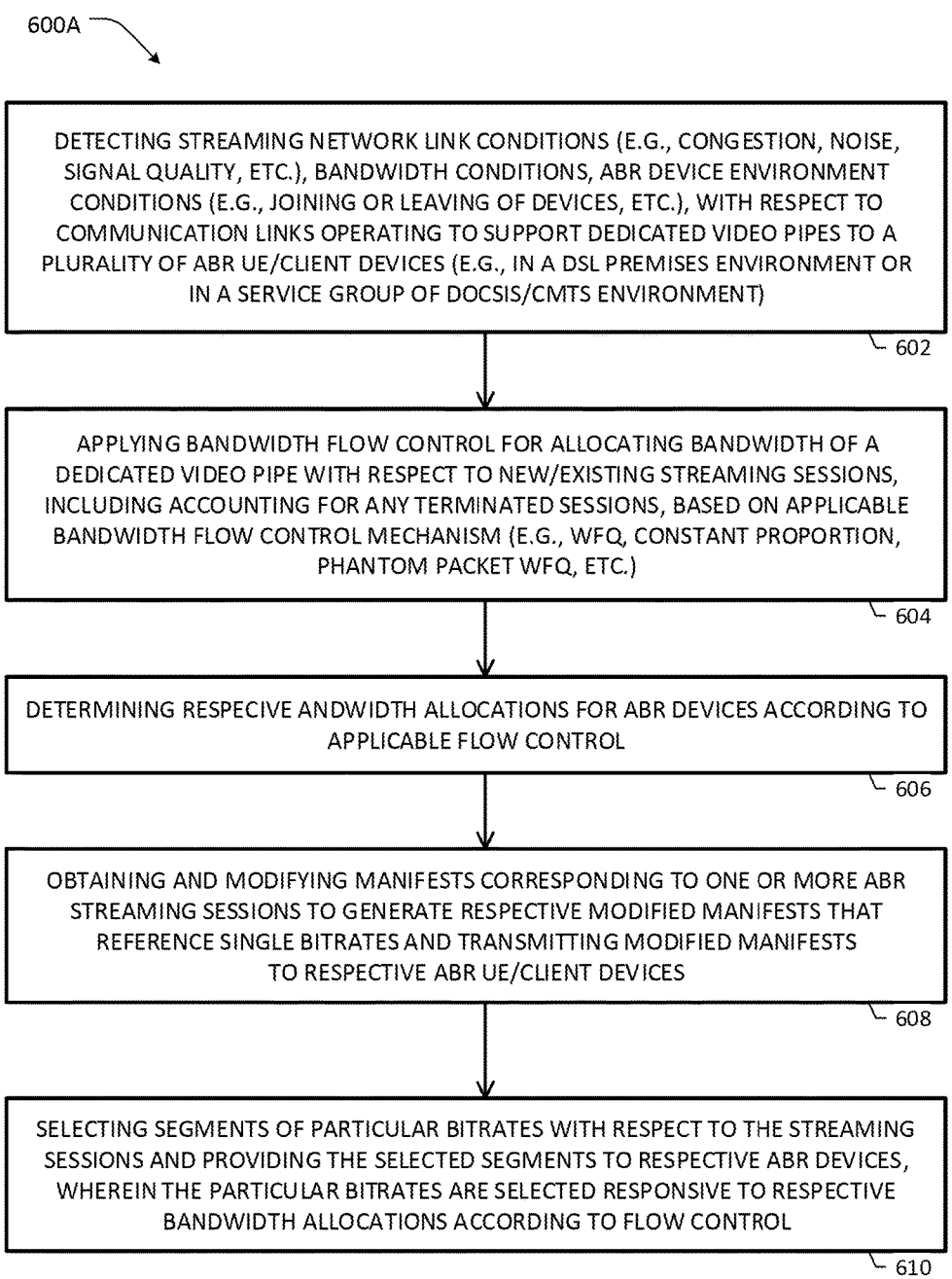
FIGS. 6A and 6B are flowcharts that may be rearranged in one or more embodiments relative to an example selective ABR segment delivery process of the present patent application.
Figure 6B:
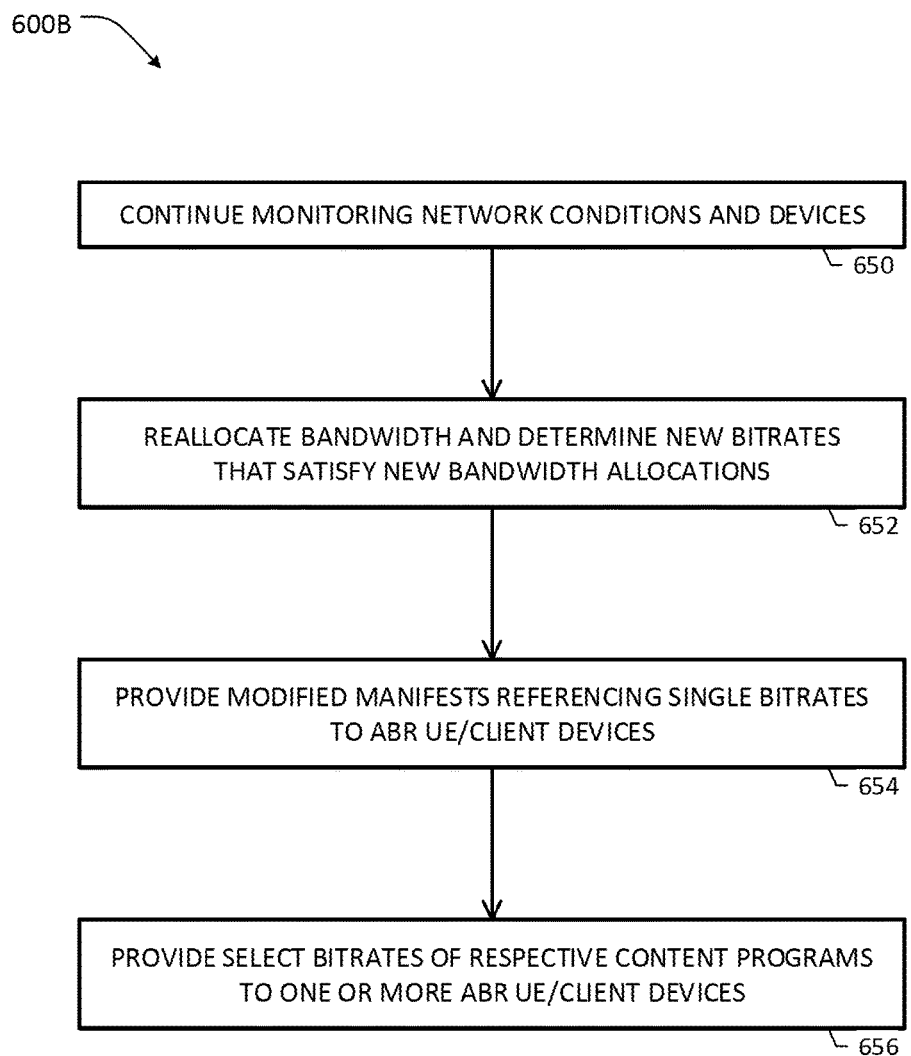

FIGS. 6A and 6B are flowcharts that may be rearranged in one or more embodiments relative to an example selective ABR segment delivery process of the present patent application. Process 600A of FIG. 6A is illustrative of a selective segment delivery process applied to a plurality of ABR client devices in an example multi-device environment wherein respective segments are selected with respect to the corresponding ABR streaming sessions. At block 602, various streaming network link conditions (e.g., congestion, signal-to-noise, video quality, etc.) as well as bandwidth conditions and device environment conditions (e.g., new devices joining or coming on line, existing streaming sessions being terminated, etc.) may be monitored or obtained with respect to the communication links operating to support dedicated video pipes to a plurality of ABR UE/client devices. As noted previously, the ABR UE/client devices may be disposed in a DSL subscriber premises or distributed across a service group of the DOCSIS/CMTS network environment. A suitable bandwidth flow control mechanism may be applied for allocating bandwidth of a dedicated video pipe with respect to new/existing streaming sessions, including accounting for any terminated sessions, e.g. based on WFQ, constant proportion, WRR, phantom packet-based WFQ, etc. (block 604). Bandwidth allocations for the respective ABR devices and associated streaming sessions are accordingly determined, estimated, obtained, or otherwise calculated (block 606). At block 608, full ABR manifests corresponding to the one or more ABR streaming sessions are received, obtained, or otherwise retrieved, e.g., from a content source network storage, a CDN cache or a suitable media ingestion point. The full ABR manifests may be modified in order to generate respective modified manifests that references respective single bitrates, which may be transmitted to the respective ABR client devices, as set forth in block 608, to deactivate respective bandwidth estimation and segment selection processes thereat. Selective segments of particular bitrates are respectively determined or otherwise obtained for the respective streaming sessions, which are provided to the ABR client devices, wherein the particular bitrates are selected responsive to respective bandwidth allocations according to the applicable flow control mechanism (block 610). In an additional variation, the selection logic for selecting the bitrates may be further modulated or fine-tuned based on a threshold or guard band applied to the respective bandwidth allocations in order to account for any unexpected conditions encountered by the ABR client devices. For example, establishing a first threshold ("ceiling" threshold) percentage of X would allow selecting a highest bitrate (of the full ABR bitrates) that is below or within the X % of the allocated bandwidth for a particular ABR client/s streaming session, which allows optimizing the bandwidth across the ABR client devices while still providing the absolute best quality segments to the devices. Likewise, a second or "floor" threshold may allow selection of at least an acceptable minimum bitrate quality for the segment delivery.

Process 600B shown in FIG. 6B is illustrative of a dynamic manifest modification process that may be employed in conjunction with selective segment delivery in another example embodiment of the present invention. At block 650, network link conditions and/or ABR device status conditions may continue to be monitored, e.g., as noted above. Responsive thereto, bandwidth allocations may be (re)adjusted and/or (re)allocated for the ongoing ABR streaming sessions, which enable the determination and/or selection of new bitrates for the respective streaming sessions, subject to any threshold conditions (block 652). Single bitrate manifests, which may be the modified single bitrate manifests previously obtained or newly modified, may be provided to the ABR client devices as before (block 654). New selected single bitrate segments may be provided to the ABR client devices with respect to the respective content programs (block 656). Further, in a DOCSIS/CMTS implementation, an example SSD process may automatically adapt the segments being delivered as a result of the bandwidth dynamically changing across the service groups.

Figure 7:
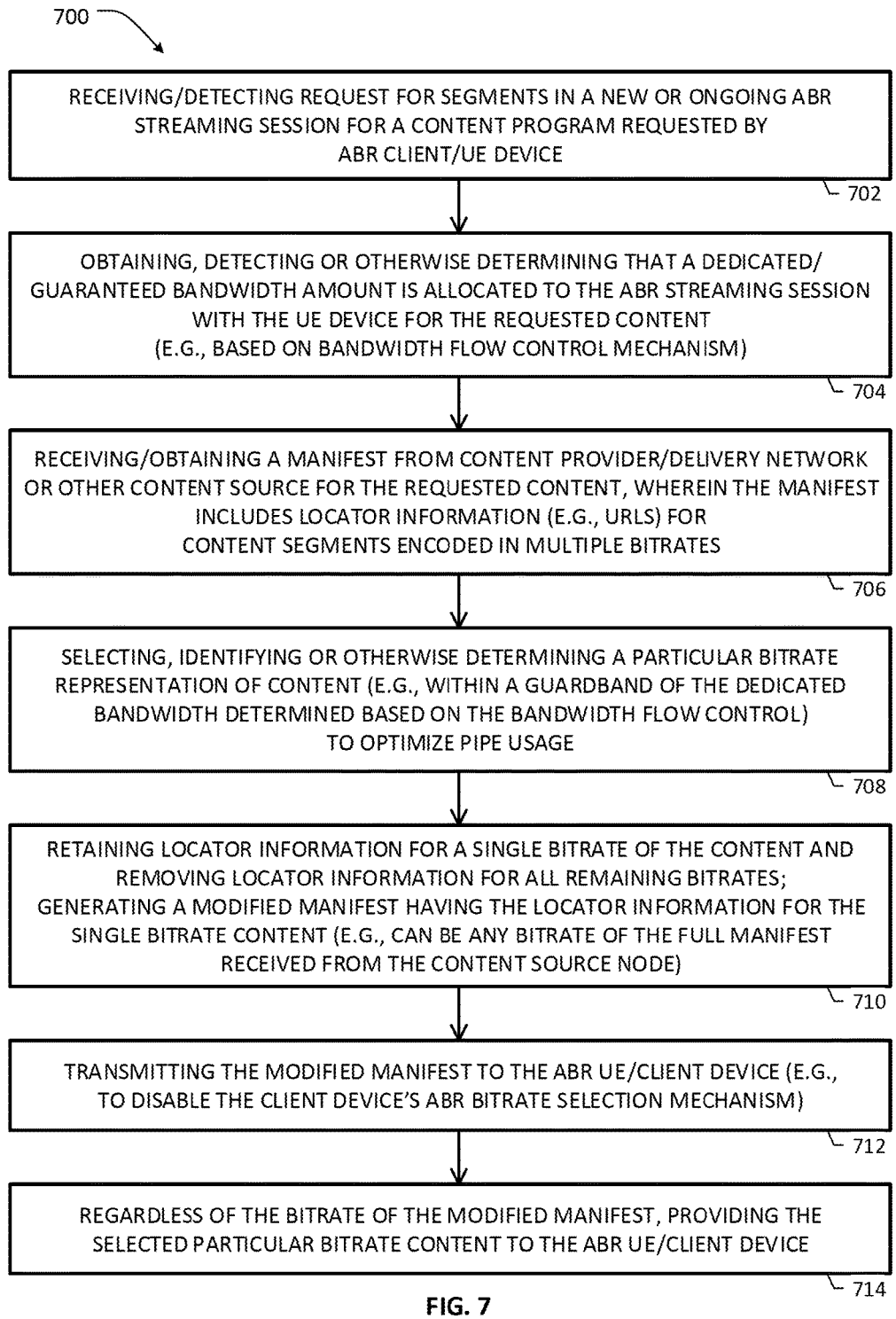
FIG. 7 is a flowchart relative to another aspect of a selective ABR segment delivery process of the present patent application.

FIG. 7 is a flowchart relative to another aspect of a selective ABR segment delivery process 700 that illustrates further details in an example implementation. At block 702, a request for media segments is received with respect to a new or ongoing ABR streaming session for a content program. At block 704, a determination may be made that a dedicated or guaranteed bandwidth amount is allocated to the ABR streaming session based on a flow control mechanism, which may take into account device policies, weights, content provider policies, etc. A full ABR manifest may be received, retrieved or otherwise obtained from the content source, wherein the full ABR manifest includes references (e.g., locator information such as URLs) for the content segments encoded in multiple bitrates (block 706). At block 708, a segment selection logic may be executed for selecting, identifying, or otherwise determining a particular bitrate representation of content (e.g., within a threshold or guard band window) to optimize the pipe usage. At block 710, locator information for a single bitrate representation may be retained while the locator information for the remaining bitrate representations is removed, thereby generating a modified manifest containing the locator information for the single bitrate. As noted previously, the single bitrate can be any bitrate contained in the full ABR manifest. The modified manifest is transmitted to the ABR UE/client device so as to disable or otherwise suppress the device's bitrate and segment selection mechanism (block 712). Regardless of the bitrate of the modified manifest, the particular bitrate representation of the segment selected in block 708 is provided to the ABR UE/client device (block 714).

Figure 8:
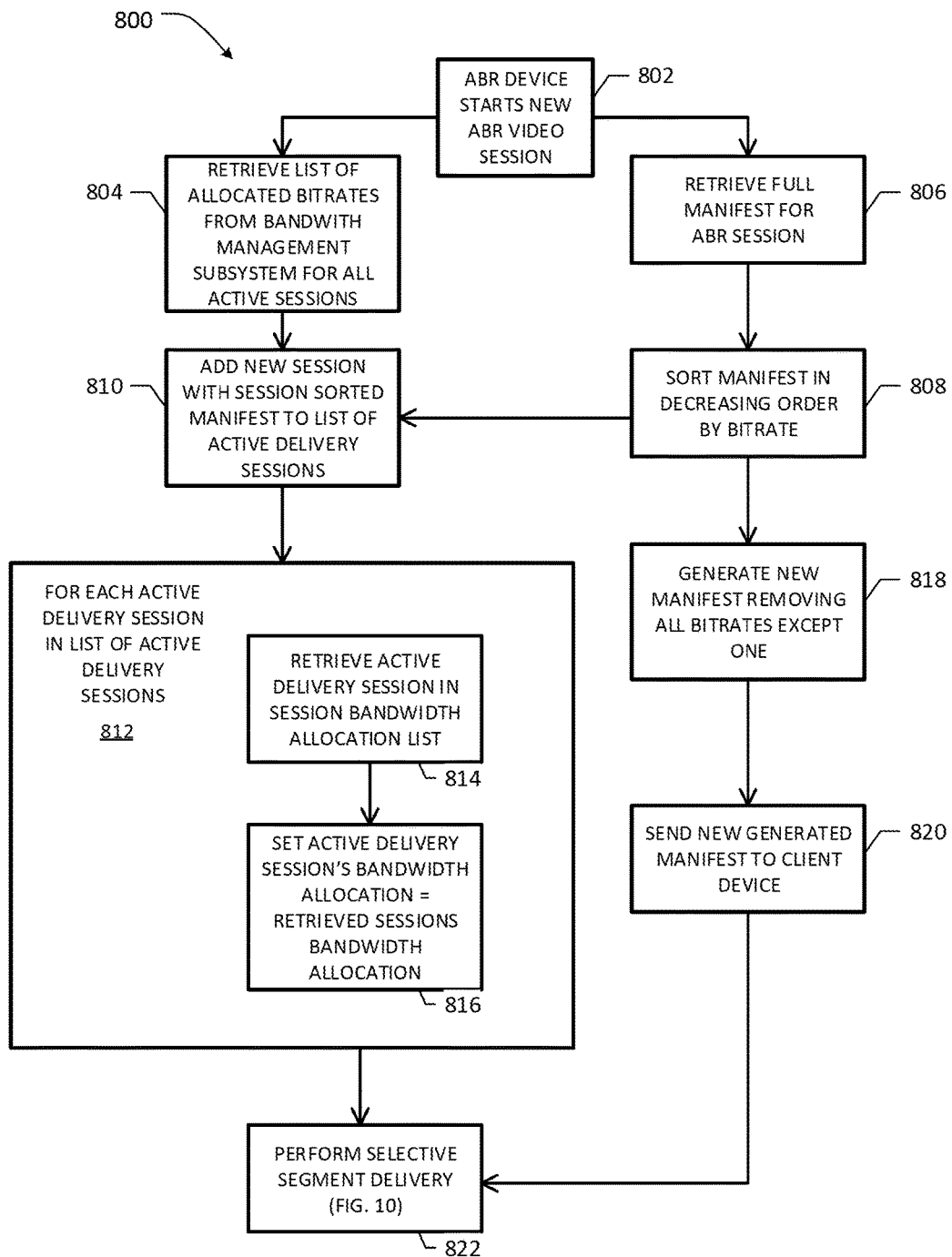
FIG. 8 is a flowchart depicting additional details relative to performing a selective ABR segment delivery process of the present patent application when a new ABR device/session is added or otherwise joined.

FIG. 8 is a flowchart depicting additional details relative to performing a selective ABR segment delivery process of the present patent application when a new ABR device/session is added or otherwise joined. Broadly, process 800 is representative of various steps, blocks, or acts that may be executed as part of a new ABR device startup when the device is requesting an ABR session. In the example embodiment, it is assumed that the bandwidth management system has already calculated the bitrates for all of the devices including the new device. Responsive to the new ABR device starting a video streaming session (block 802), example SSD system retrieves a list of allocated bitrates for all active ABR sessions as well as a full manifest from the CDN or network storage for the requested ABR session, as noted at blocks 804 and 806. The full ABR manifest is then sorted by decreasing bitrate (block 808). The new session is added to the list of active sessions with the session's sorted manifest (block 810). The example SSD system then traverses the list of active sessions in an iterative loop process 812, updating the active session's delivery rate to the new rate retrieved from the bandwidth management system, as set forth at blocks 814 and 816 of the iterative loop. In addition, the manifest is stripped of all bitrates but one (e.g., the first or highest bitrate), whereupon the modified manifest having the single bitrate reference locator information is sent to the ABR client device (blocks 818 and 820). At block 822, selective segment delivery continues delivering the optimal segments to all active ABR clients including the new ABR client, a specific implementation of which will be set forth in additional detail below in reference to FIG. 10.

Figure 9:
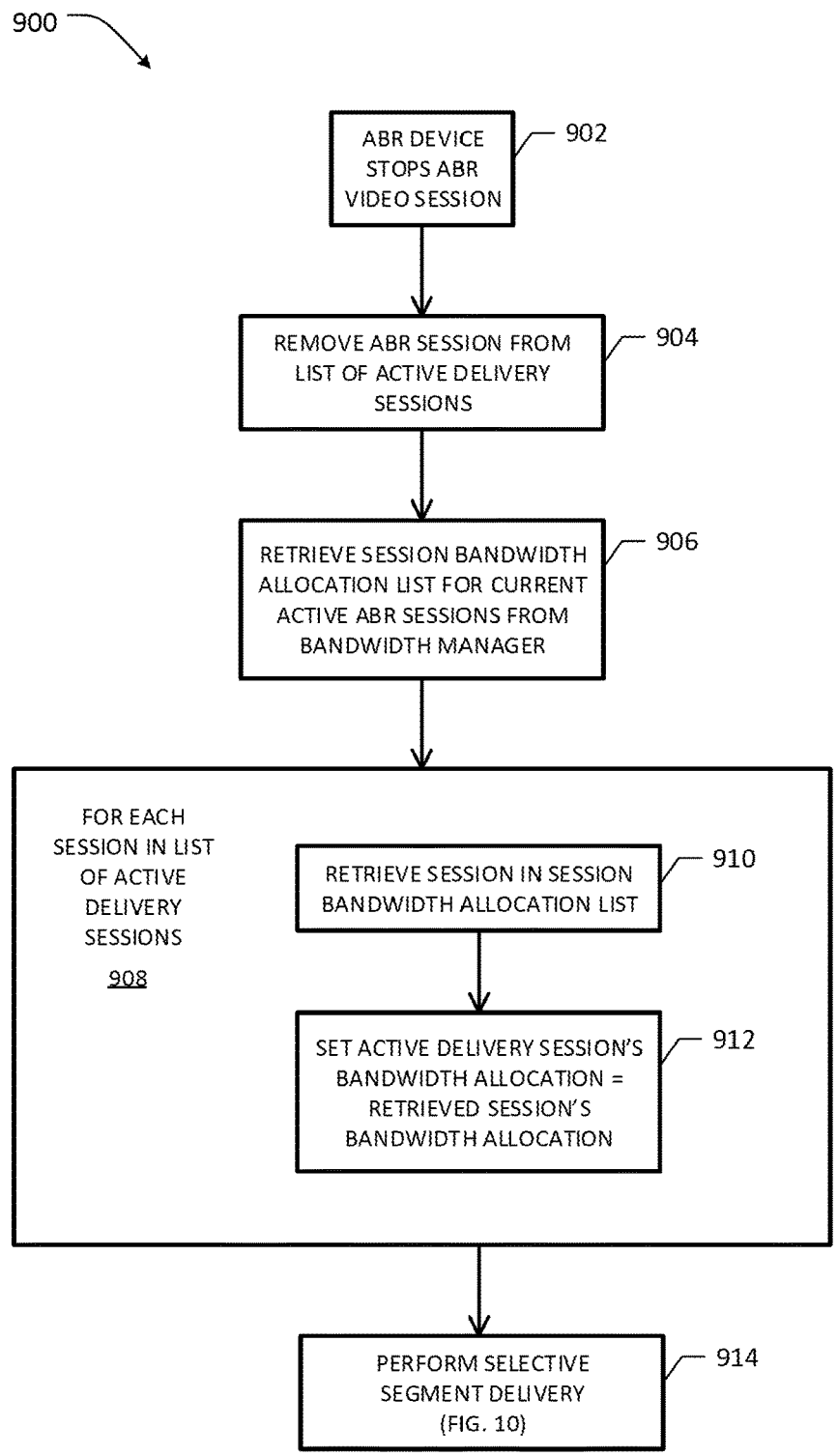
FIG. 9 is a flowchart depicting additional details relative to performing a selective ABR segment delivery process of the present patent application when an ABR device/session is ended or otherwise terminated.

FIG. 9 is a flowchart depicting additional details relative to performing a selective ABR segment delivery process of the present patent application when an ABR device/session is ended or otherwise terminated. Similar to the process 800 above, it is assumed in process 900 that the bandwidth management system has already calculated the bitrates for all of the existing ABR devices excluding the device ending the ABR session. Responsive to receiving, determining, or otherwise obtaining a message that an ABR device has stopped, terminated or otherwise inactivated its streaming session (block 902), the ending session is removed from the list of active sessions (block 904). The example SSD system retrieves the bandwidth allocation list for all active ABR sessions from the bandwidth management system (block 906). For each active delivery session, an iterative loop process 908 is executed wherein the new allocated bandwidth is updated for the session based on the allocated bandwidth from the bandwidth management system, as noted at block 910 and 912 of the iterative loop. At block 914, a specific implementation of selective segment delivery may be executed for continuing delivery of selective segments for all active sessions with optimized segment delivery per session.

Figure 10A:
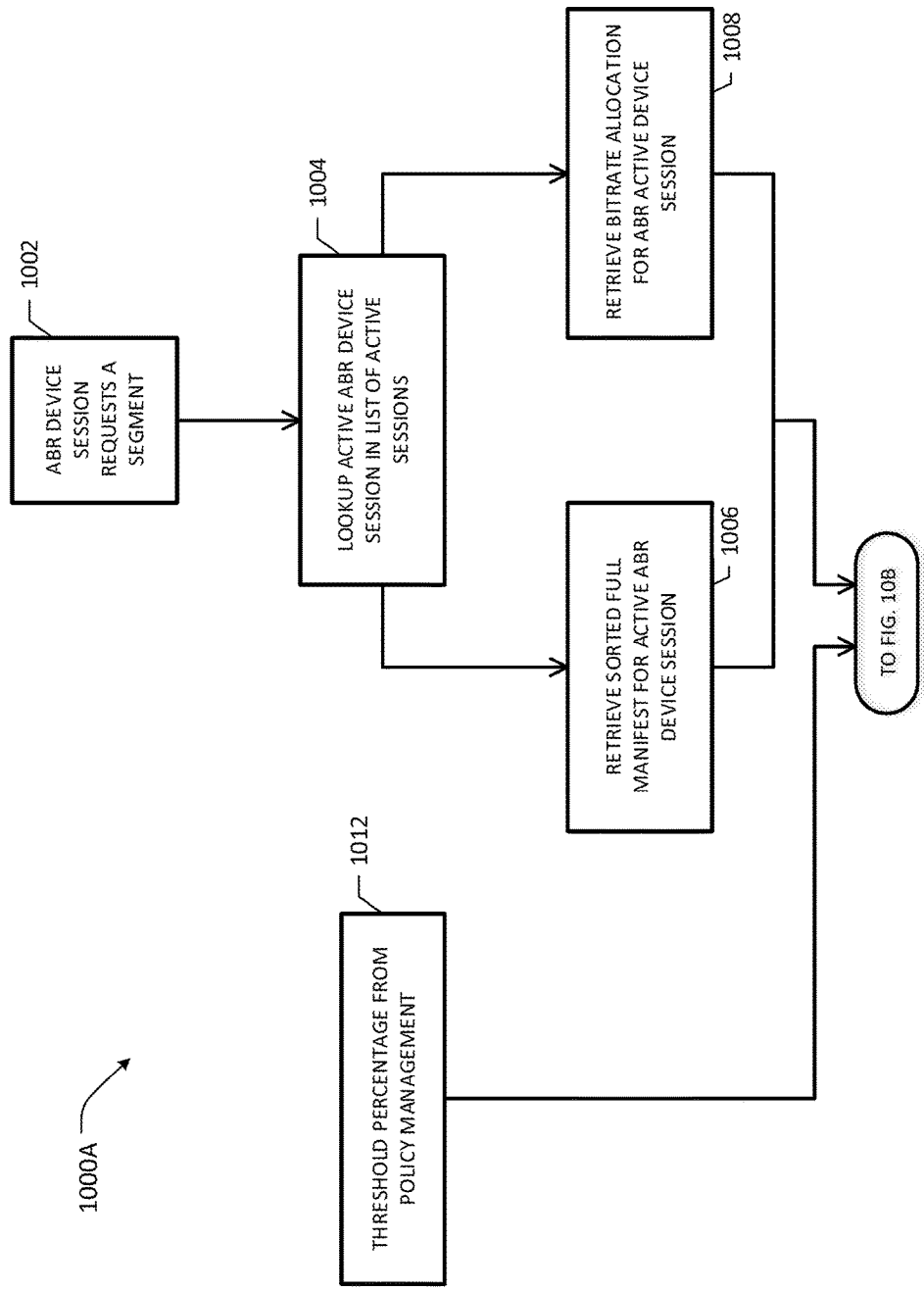
FIGS. 10A and 10B are flowcharts depicting additional details relative to a selective ABR segment delivery process according to an embodiment.
Figure 10B:
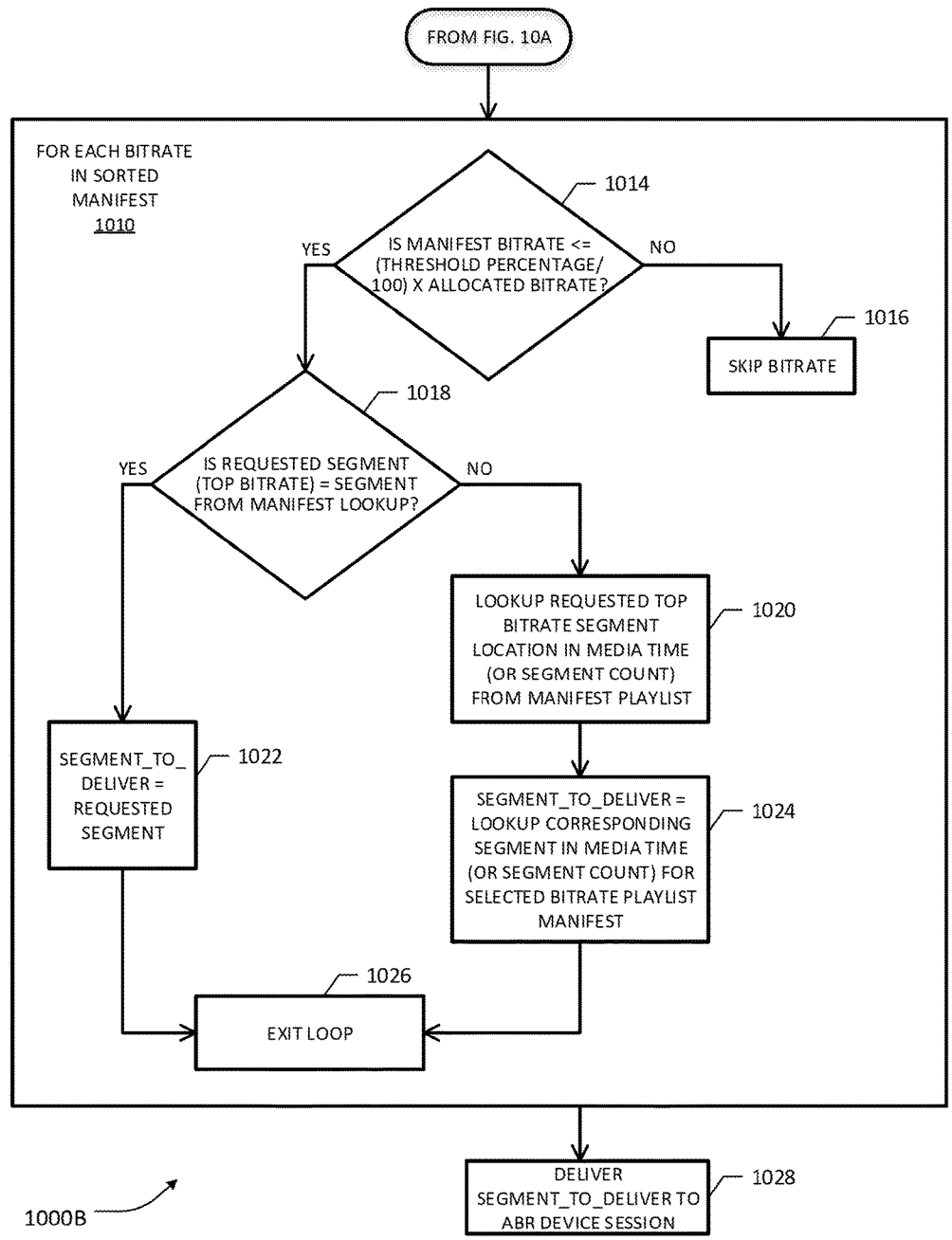

FIGS. 10A and 10B are flowcharts depicting additional details relative to a specific implementation of an example selective ABR segment delivery process 1000A/1000B according to an embodiment. In one example scenario, each time an ABR client device requests a segment, the overall process 1000A/1000B may be configured to execute a selection logic to determine the optimal segment to deliver based on allocated bandwidth for the ABR client's session. In the illustrated embodiment, when a client requests a segment (block 1002), the requesting client's session may be retrieved from the active session's list, e.g., by way of a lookup table as set forth at block 1004. As noted previously, both the bitrate allocation and the sorted full manifest may be used in determining the optimal segment to deliver, as indicated by the actions set forth at blocks 1006 and 1008. In the segment selection process, a threshold percentage may be used to determine the optimal segment to deliver. In one arrangement, if the manifest bitrate≤threshold percentage x allocated bitrate, then the segment represented by the manifest playlist for the selected bitrate may be delivered to the ABR client. Turning to FIG. 10B, the segment selection logic may be executed in an iterative loop process 1010 wherein a threshold window parameter may be obtained from or provided by a policy management component, e.g., associated with node 104 in FIG. 1 or node 402 in FIG. 4. A decision block 1014 is operative to implement the foregoing threshold-based selection logic. If the manifest bitrate is not less than or equal to the guard-banded allocated bitrate, that bitrate may be skipped (block 1016). A further determination is made as to whether the requested segment's bitrate (e.g., the top bitrate) is equal to the segment's bitrate from the manifest lookup (block 1018). If so, the requested segment is set to Segment_To_Deliver (block 1022), whereupon the iterative loop process exits (block 1026) and the selected Segment_To_Deliver is delivered to the ABR device for the streaming session (block 1028). Alternatively, if the determination of decision block 18 is negative, a lookup is performed for the requested bitrate segment in media time or segment count from the media playlist and a corresponding Segment_To_Deliver is accordingly determined (blocks 1020 and 1024), which is then delivered to the ABR streaming session (block 1028).

Figure 11A:
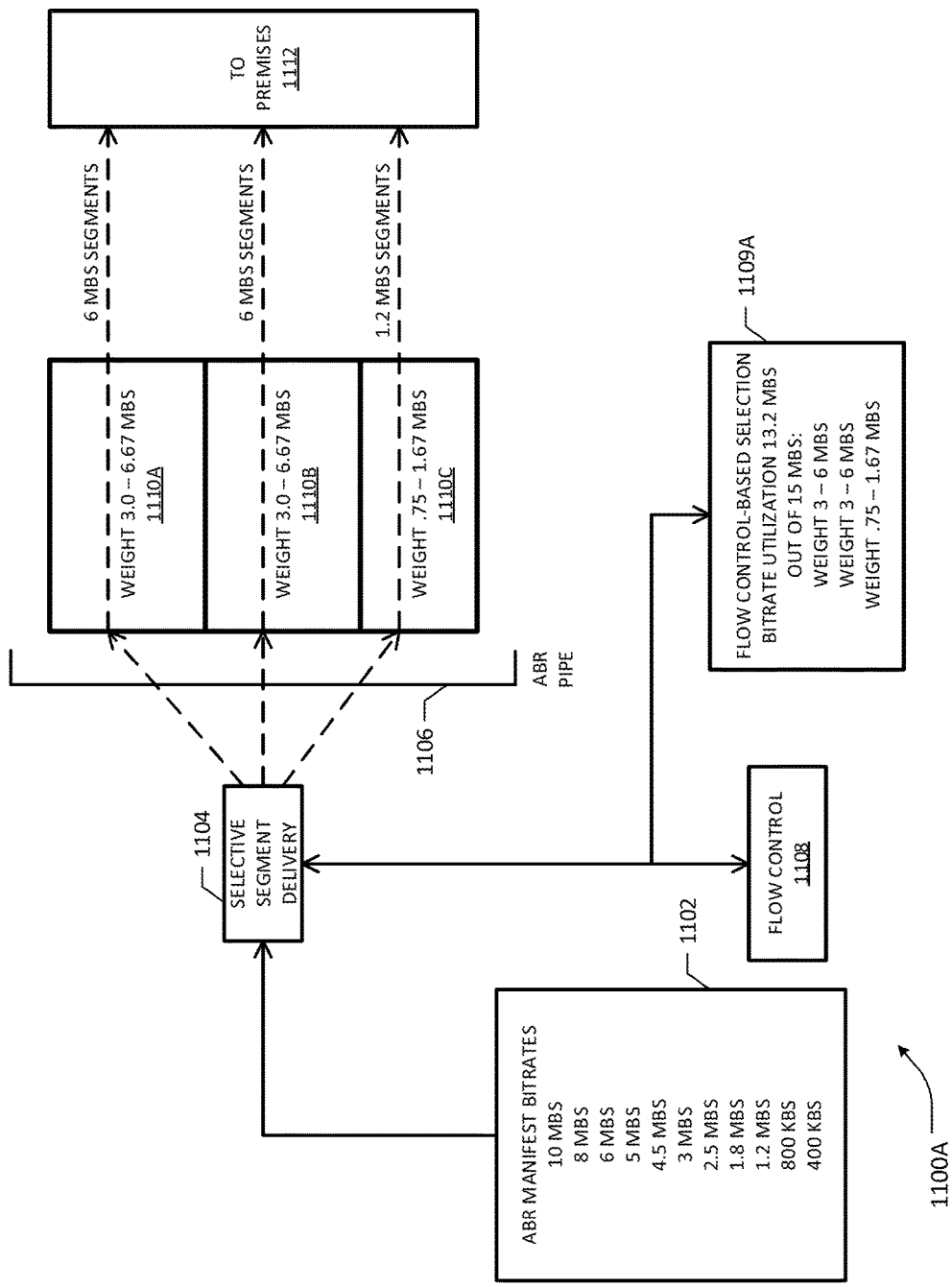
FIGS. 11A and 11B depict example bandwidth control and allocation scenarios with respect to a managed virtual delivery pipe serving a plurality of ABR devices of a premises wherein respective selective ABR segments may be delivered according to the teachings of the present patent application.
Figure 11B:
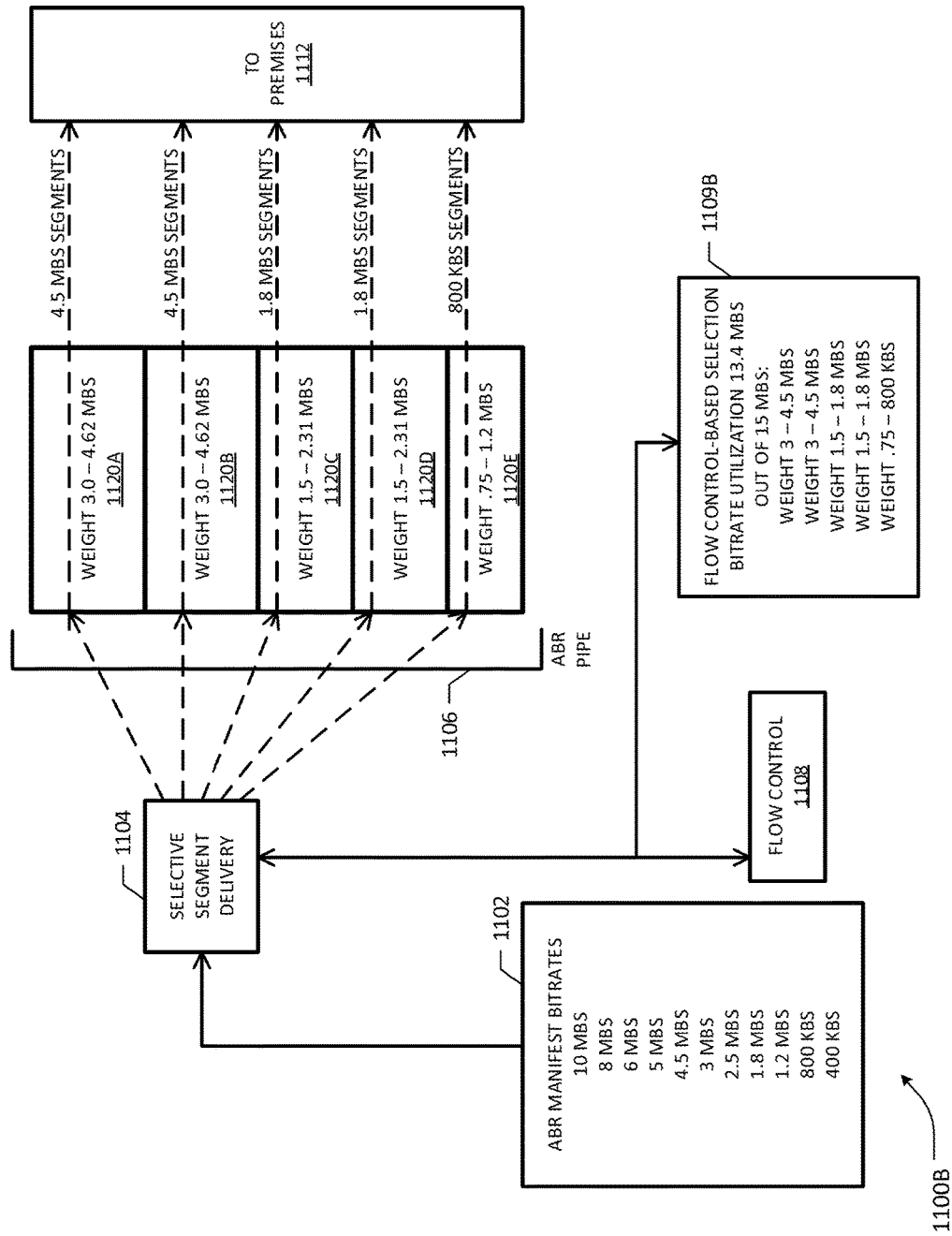

FIGS. 11A and 11B depict example bandwidth control and allocation scenarios with respect to a managed virtual delivery pipe serving a plurality of ABR devices of a premises wherein respective selective ABR segments may be delivered according to the teachings of the present patent application. Scenario 1100A of FIG. 11A is illustrative of bandwidth allocation with respect to an ABR delivery pipe 1106 of 15 Mbs serving a subscriber premises 1112 having three devices (not specifically shown). SSD module 1104 interoperates with a flow control module 1108 which allocates a pipe portion 1110A of 6.67 Mbs to a first ABR device, a pipe portion 1110B of 6.67 Mbs to a second ABR device, and a pipe portion of 1110C of 1.67 Mbs to a third device, based on a phantom packet WFQ technique that utilizes respective weights of 3.0, 3.0 and 0.75 values for the three ABR device sessions. A full ABR manifest 1102 illustratively applicable to each of the sessions contains bitrates ranging from a lowest bitrate of 400 Kbs to a highest bitrate of 10 Mbs. Responsive to the bandwidth allocations provided by the flow control module 1108, SSD module 1104 is operative to select 6.0 Mbs segments for delivery to the first two ABR devices whereas 1.2 Mbs segments are selected for delivery to the third device, as set forth in block 1109A, each of which is referenced in the full ABR manifest 1102. It should be appreciated that for each streaming device, the absolute best quality segments possible are selected for the respective sessions while still being within the allocated bandwidth maximums, thereby optimizing and balancing the overall pipe usage vis-à-vis video quality. In the illustrated use case scenario, it can be seen that a total of 13.2 Mbs is utilized out of the 15 Mbs pipe, i.e., 88% utilization rate.

Turning to FIG. 11B, scenario 1100B is illustrative of bandwidth allocation with respect to the same ABR delivery pipe 1106 of 15 Mbs serving subscriber premises 1112 having five devices (not specifically shown). As before, SSD module 1104 interoperates with the flow control module 1108 which allocates pipe portions 1120A, 1120B of 4.62 Mbs each to two ABR devices, pipe portions 1120C, 1120D of 2.31 Mbs each to third and fourth ABR devices, and a pipe portion 1120E of 1.2 Mbs to a fifth device, based on a phantom packet WFQ technique that utilizes respective weights of 3.0, 3.0, 1.5, 1.5 and 0.75 values for the five ABR device sessions. Similar to the scenario 1100A of FIG. 11A, example full ABR manifest 1102 illustratively applicable to each of the sessions contains bitrates ranging from a lowest bitrate of 400 Kbs to a highest bitrate of 10 Mbs. Responsive to the bandwidth allocations provided by the flow control module 1108, SSD module 1104 is operative to select 4.5 Mbs segments for delivery to the first two ABR devices, 1.8 Mbs segments for delivery to the third and fourth ABR devices, and finally, 800 Kbs segments for delivery to the fifth ABR device, as set forth in block 1109B, each of which being referenced in the full ABR manifest 1102. Again, absolute best quality segments may be selected for the respective sessions while still satisfying the allocated bandwidth maximums, respectively, thereby balancing the overall pipe usage vis-à-vis video quality. In the illustrated five ABR device use case scenario, a total of 13.4 Mbs is utilized out of the 15 Mbs pipe (i.e., over 89% utilization). One skilled in the art will recognize that where more ABR devices are serviced via a delivery pipe, a higher ratio of utilization of the pipe may be achieved as compared against a scenario with fewer ABR devices under ceteris paribus conditions while still achieving highest possible video qualities.

Skilled artisans will recognize upon reference hereto that a downside of bandwidth control based on ABR client behavior is that a typical ABR client cannot proactively contend for bandwidth and consume bandwidth during other ABR clients' sleep or duty cycles in a multi-device environment. A corollary effect of a WFQ-based bandwidth management can therefore be manifested in increasing the initial startup/playout time of the ABR client. In general, ABR clients typically buffer roughly 1.5 segments before playout begins. In addition, if a subscriber uses client-based control to jump to another location in the video, the client must re-buffer the new segments. Again, the bandwidth flow control can lengthen the initial playout/startup time of the client in such scenarios. To address these concerns, additional embodiments of the present invention may be provided wherein the GOP structure of the segments may be analyzed and, if possible, shorter sub-segments or fragments may be generated for at least an initial period of time during startup in order to speed up the initial buffer load. Moreover, by combining with selective segment delivery, further embodiments of the present invention may be configured to retrieve an allocated bitrate from a bandwidth flow control system and optimize the choice of bitrates for initial segment delivery. An added policy control may also be provided wherein a tradeoff between startup speed and initial quality may be implemented. One skilled in the art will appreciate that an advantage of this group of embodiments is that anytime a client must fill/refill its buffer, the time required for rendering of the video may be greatly reduced. As noted above, these times are initial startup (i.e., a new streaming session is requested) and when rewinding or fast-forwarding in a video program.

Figure 12:
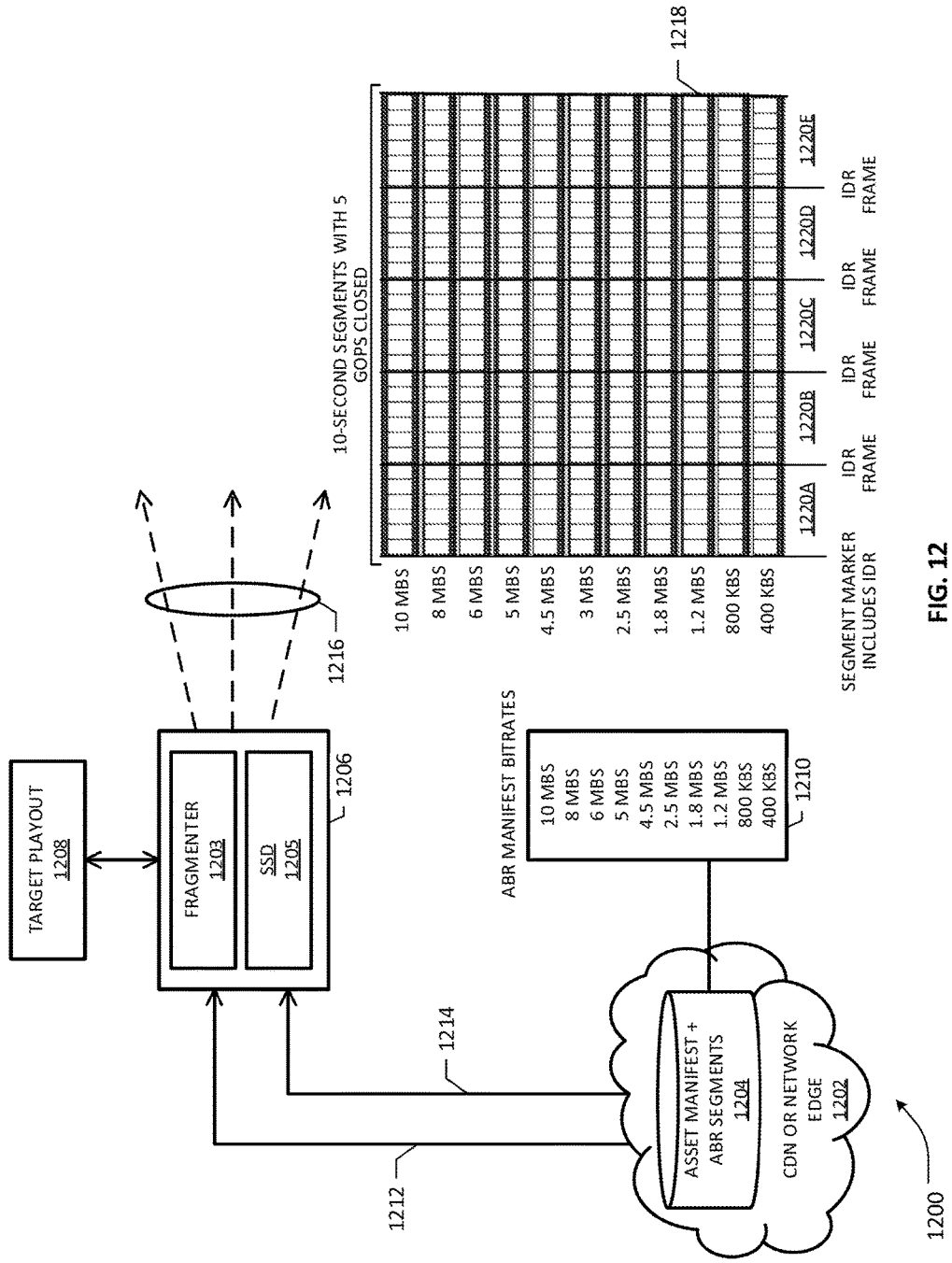
FIG. 12 depicts a portion of an example ABR streaming network wherein a selective segment delivery mechanism may provided in association with segment (re)fragmentation for effectuating fast ABR startup according to an embodiment of the present invention.

FIG. 12 depicts a portion of an example ABR streaming network wherein a selective segment delivery mechanism may provided in association with segment (re)fragmentation for effectuating fast ABR startup according to an embodiment of the present invention. One skilled in the art will readily recognize that the depicted portion 1200 is representative of a part of an ABR network such as network 400 described hereinabove in detail. Accordingly, the description of FIG. 4 is also applicable here, mutatis mutandis, at least for purposes of an example embodiment of the present invention involving either DSL or DOCSIS/CMTS infrastructure. A target playout policy manager or module 1208 may be provided for operating in conjunction with a fragment selection module or apparatus 1206 comprising a segment fragmenter 1203 and an SSD module 1205. As before, a CDN or network edge portion 1202 is operably associated with a media asset storage unit 1204 containing media segments and full ABR manifests, which may be provided to the apparatus 1206 via respective paths 1212 and 1214 to the fragment selection apparatus 1206. An example full ABR manifest 1210 may include references to segments in a number of bitrates, e.g., from 400 Kbs to 10 Mbs, wherein segments of appropriate duration may be provided for each media asset. In one arrangement, each bitrate representation of a segment may contain a number of closed GOPs depending on the particular encoding scheme used. As an example, reference numeral 1218 refers to a package of 10-second segments in each bitrate representation, wherein each segment comprises 5 closed GOPs 1220A-1220E. In general, a GOP structure can contain various types of pictures or frames such as I frames (intra coded pictures), P frames (predictive coded pictures), and B frames (bi-directional predictive pictures). As such, a closed GOP does not contain any frame that refers to a frame in another GOP (e.g., in a previous or next GOP). A special type of I-frames known as Instantaneous Decoder Refresh (IDR) frames may also be provided in an encoded video sequence, wherein an IDR frame specifies that no frame after the IDR frame can reference any frame before it. In the illustrative 10-second segment package structure 1218 shown in FIG. 12, five IDR frames are exemplified with respect to the possibility of fragmenting each bitrate representation into five fragments, each comprising a full GOP.

According to an embodiment of the present invention, media segments provided to the fragment selection apparatus 1206 may be fragmented into a plurality of fragments each starting with an IDR frame. As noted previously, a device/content policy management component (e.g., component 408 in FIG. 4) may be configured to provide a desired initial video playout startup/render time as a target playout condition or policy 1208. Similar to the embodiment set forth in FIG. 4, SSD component 1205 is operative to request/obtain the full ABR manifest 1210 for the ABR package from network storage or CDN delivery node. A segment size adjustment mechanism executing at fragmenter 1203 may be configured to receive the full manifest from SSD 1205 in order to analyze and potentially re-segment the initial segment at startup into smaller sub-segments or fragments. In one arrangement, if there are a number of IDR frames, the segment may be broken up into smaller fragments as pointed previously, whose durations/lengths may be modulated responsive to the target playout policies vis-à-vis desired video quality. The manifest is modified to reference the newly generated sub-segments or fragments. Smaller segments, e.g., sub-segments or fragments, may be utilized along with segment selection logic based on encoded bitrate vs. flow control bitrate comparison (e.g., executed by SSD component 1205) in order to provide a faster initial startup time because the entire full segment is not transmitted to the ABR client. Reference numeral 1216 refers to a plurality of fragment streams at different bitrates that may be generated toward ABR client/UE devices. Skilled artisans will recognize that a modified manifest similar to the embodiments SSD embodiments described hereinabove may be provided to the ABR client so as to disable the client's bitrate and segment selection logic. Likewise, a threshold window policy may also be provided in conjunction with the target playout policy in order to fine-tune the initial playout process (e.g., a tradeoff between the initial quality and initial playout/rendering speed), which can allow a more customized setting for desired viewing experience.

Figure 13A:
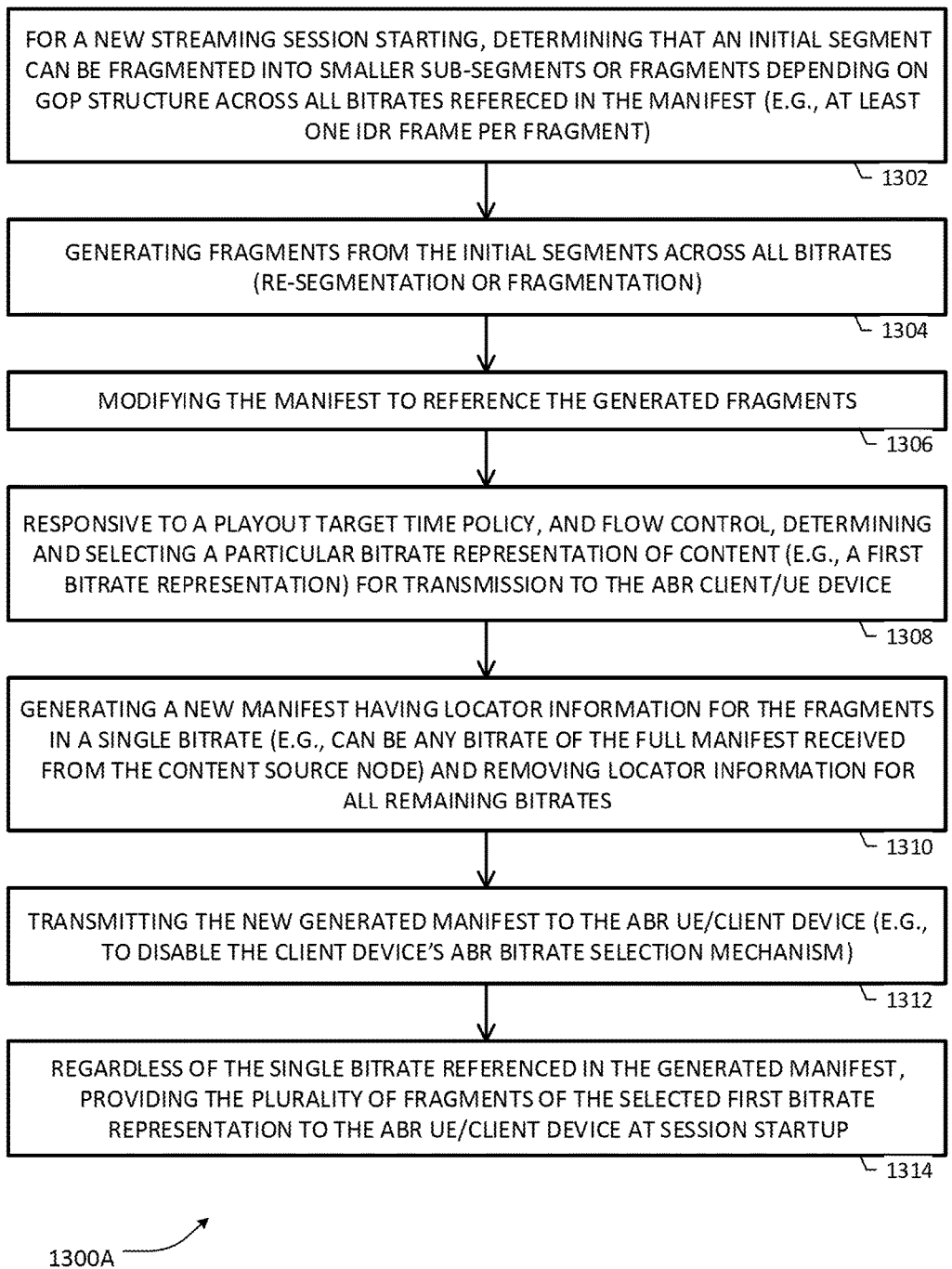
FIGS. 13A and 13B are flowcharts that may be rearranged in one or more embodiments relative to an example fast ABR startup process in conjunction with selective ABR segment delivery of the present patent application.
Figure 13B:
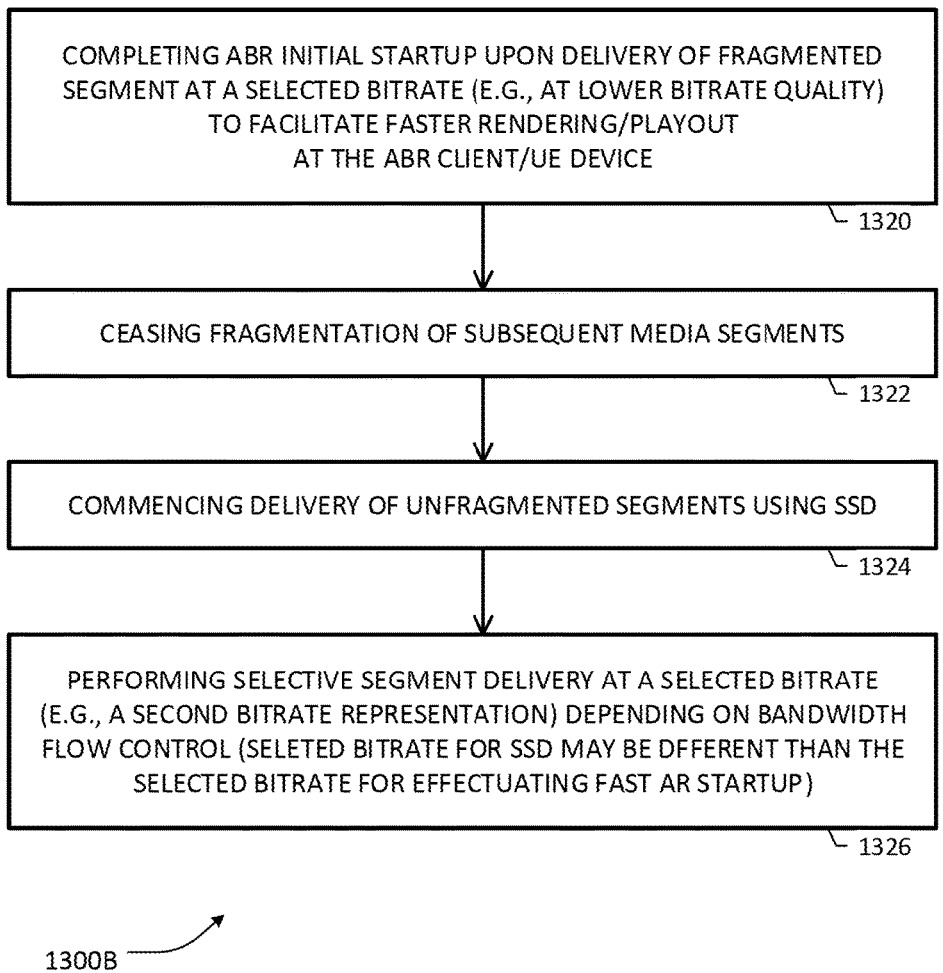

FIGS. 13A and 13B are flowcharts that may be (re)arranged in one or more embodiments relative to an example fast ABR startup process in conjunction with selective ABR segment delivery of the present patent application. In process 1300A of FIG. 13A, a determination may be made with respect to a new streaming session started by an ABR client/UE device, e.g., upon detecting a client request therefor, as to whether an initial segment can be fragmented into smaller sub-segments or fragments depending on GOP structure across all bitrates referenced in the manifest (e.g., at least one IDR frame per fragment), as set forth at block 1302. Responsive to the determination, fragments of suitable duration may be generated from the initial segments across all bitrates, i.e., re-segmentation or fragmentation (block 1304). As noted previously, the manifest may be modified to reference the generated fragments (first modification). Also, responsive to a playout target time policy, and potentially/optionally in conjunction with flow control, a particular bitrate representation of content (e.g., a first bitrate representation) may be determined, obtained or otherwise selected for transmission to the ABR client/UE device. These foregoing acts are set forth at blocks 1306 and 1308, respectively. A new manifest having locator information for the fragments in a single bitrate may be generated from the modified manifest wherein the location information for all remaining bitrates is removed (block 1310). Similar to the SSD process involving full segments, the single bitrate fragments can be of any bitrate of the full ABR manifest received from the content source or CDN node. Because the single bitrate manifest is now generated from the previously modified manifest referencing the fragments rather than the full segment, this process may be referred to as a second modification process in respect of the fast ABR startup embodiment set forth herein. The new-generated manifest referencing the single bitrate content is then provided to the ABR client/UE device so as to operate as a message signal to disable or otherwise suppress the device's ABR bitrate selection mechanism (block 1312). Regardless of the single bitrate referenced in the new-generated manifest, fragments of the selected first bitrate representation (selected as a function based on the flow control vs. target playout vs. desired video quality inter-relationship) are delivered to the ABR client/UE device during the session startup (block 1314).

It should be appreciated that video quality during the initial startup may be somewhat lower because lower bitrate representations may be selected in order to meet a specific target playout condition. Also, the startup period may be configured in various ways, e.g., depending on the passage of certain time period, signaling indicative of a player buffer being full, achieving certain level of video quality, etc., and/or in any combination thereof. Process 1300B shown in FIG. 13B is representative of a post-startup phase wherein an embodiment of the present invention may continue to employ selective segment delivery, albeit with full segments rather than segment fragments. At block 1320, completion of fast ABR startup for a streaming session is indicated upon delivery of fragment(s) of a segment at a selected bitrate (e.g., at lower bitrate quality) to facilitate faster rendering/playout at the ABR client/UE device. At block 1322, fragmentation of subsequent segments is ceased, deactivated or otherwise disabled, and the manifest file is no longer modified to contain references to fragments of media segments. Thereafter, delivery of unfragmented segments (i.e., full segments) may (re)commence accordingly using selective single bitrate segments (blocks 1324 and 1326). It will be appreciated that when an SSD process is executed using full segments, the selected segments may comprise a bitrate representation different than the bitrate representation used in the fast ABR startup phase. As illustrated in block 1326, a second bitrate representation that is higher than the first bitrate representation used in the fast ABR startup phase may be used for effectuating SSD for subsequent media transmission according to an embodiment of the present invention.

Figure 14A:
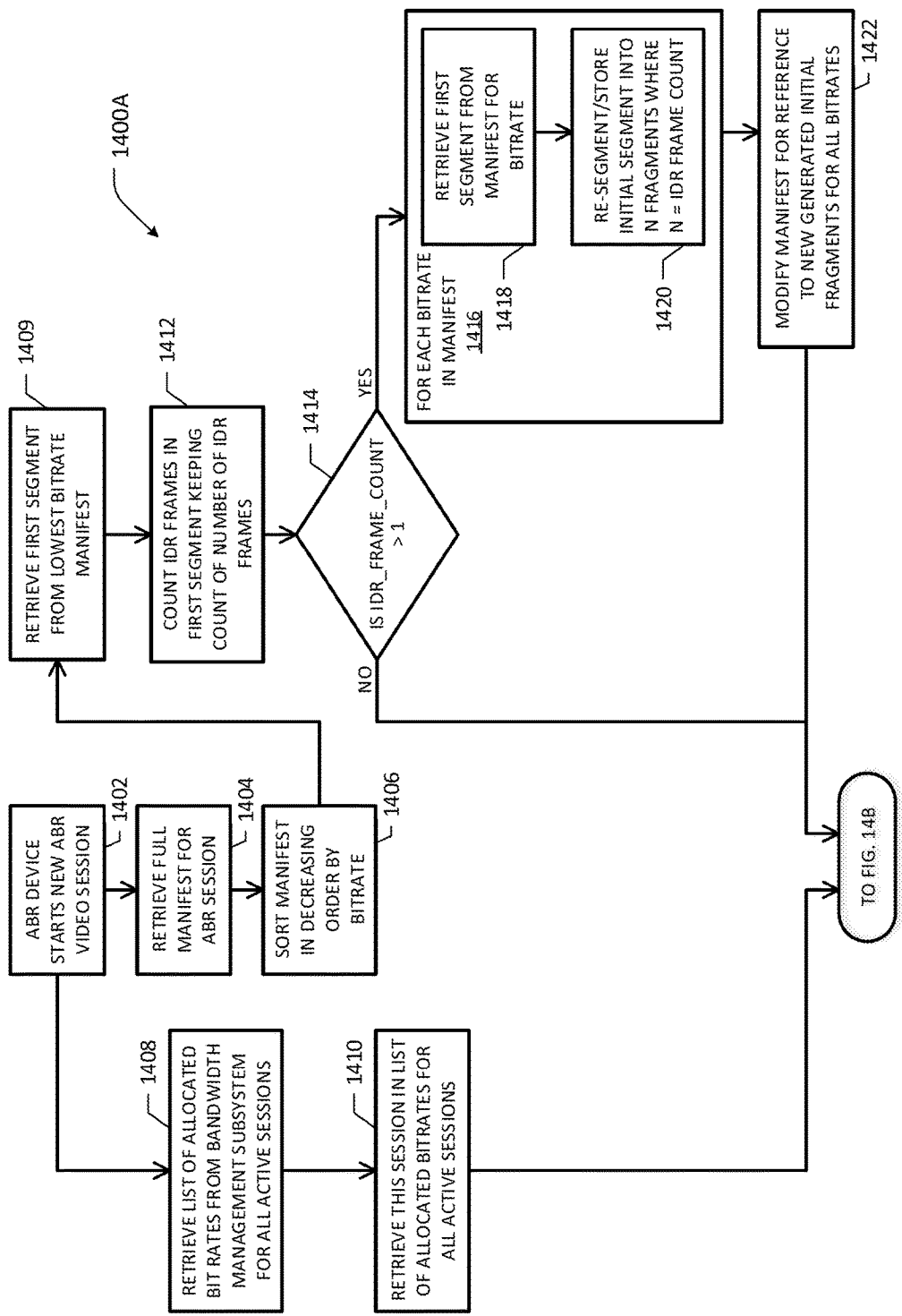
FIGS. 14A-14C are flowcharts depicting additional details relative to performing a fast ABR startup using selective ABR segment delivery in conjunction with segment (re)fragmentation.
Figure 14B:
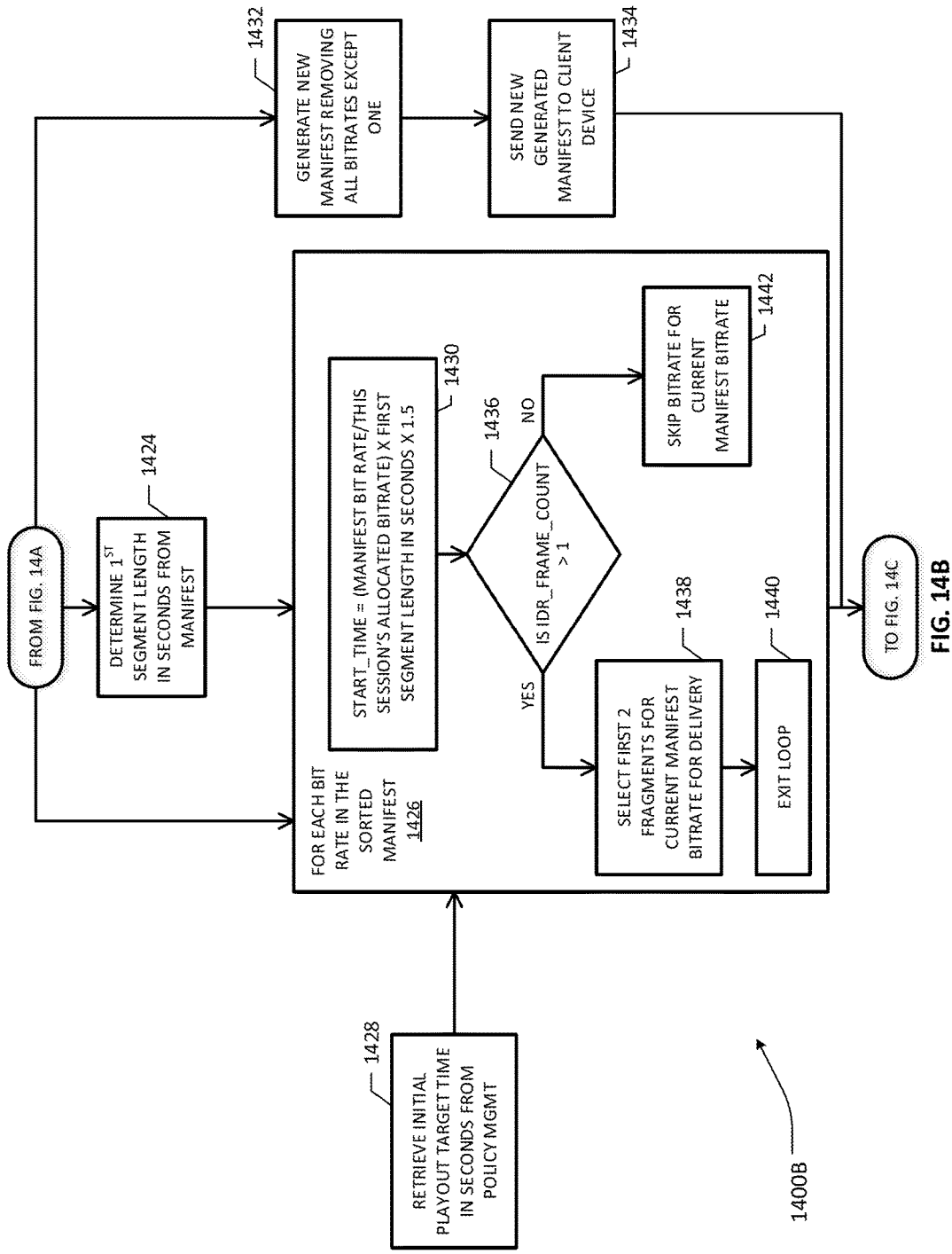
Figure 14C:
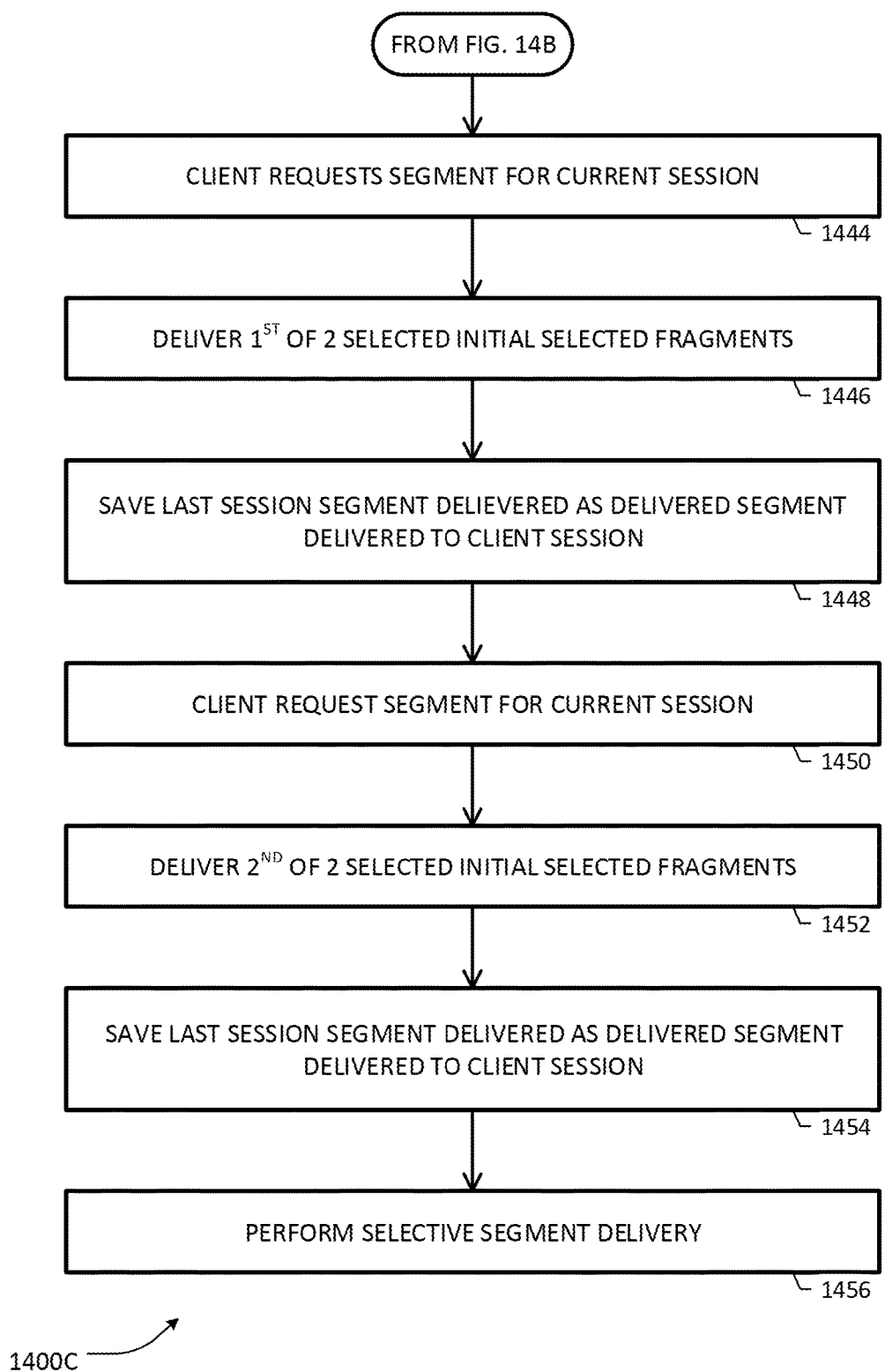

FIGS. 14A-14C are flowcharts depicting additional details relative to performing a fast ABR startup using selective ABR segment delivery in conjunction with segment (re)fragmentation (e.g., re-segmentation). Cumulatively, portions 1400A-1400C represent a process for effectuating fast ABR startup using selective segment delivery when a new ABR client/UE device requests an ABR session. Similar to the SSD embodiments described hereinabove, the example methodology set forth herein assumes that a bandwidth management and flow control system has already calculated the bitrates for all of the devices including the new device. Also similar to some of the SSD embodiments, in general, an example SSD-based fast startup system retrieves or otherwise obtains a list of allocated bitrates for all active ABR sessions. Additionally, the system retrieves the full manifest from the CDN or network storage with respect to the requested ABR session. The full ABR manifest is then sorted by decreasing bitrates. The system performs analysis on the initial segment to determine if the segment can be re-segmented into smaller sub-segments. If it is determined that smaller segments can be achieved, the initial segment is re-segmented into smaller fragments and the manifest is updated to reference the new fragments. While segment resize processing is underway, the list of allocated bitrates is retrieved from the bandwidth management system for all active sessions (including the new session). The new session's allocated bitrate is retrieved from the list of active sessions, and once the resizing is complete, the proper initial fragments are calculated based on the desired startup time. After the initial segments/fragments to deliver are selected, the delivery begins using the determined segments/fragments. In one arrangement, it should be noted that each previous segment is saved, which may be used in facilitating a fast ABR startup process for a continuing ABR session as will be set forth in reference to FIG. 15 in further detail below.

Taking particular reference to portion 1400A of FIG. 14A, set forth therein is a sub-process that illustrates two parallel sets of actions that may take place initially when an ABR device starts or requests a new streaming session (block 1402). Responsive to receiving suitable control messaging with respect to the new streaming session, a network node may be configured to retrieve a full ABR manifest for the requested session (block 1404). Also, a list of allocated bitrates may be retrieved from a suitable bandwidth flow control mechanism (e.g., phantom payload-based WFQ mechanism) with respect to all active streaming sessions including the current one (block 1408). At block 1410, the allocated bitrate for the current session may be provided as an input, among others, to an iterative loop 1426 of sub-process 1400B described further below. In parallel, the retrieved full ABR manifest for the current session is sorted in decreasing order of bitrates (block 1406). A first segment at a bitrate (e.g., the lowest bitrate representation) is retrieved (block 1409), for which the number of IDR frames are counted and recorded (block 1412). If the IDR frame count is more than one (block 1414), an iterative process 1416 is performed for each bitrate in the full ABR manifest wherein the first segment is retrieved and re-segmented into N fragments, N being the IDR frame count. These iterative steps are set forth at blocks 1418 and 1420 of the loop 1416. Skilled artisans will recognize upon reference hereto that the fragmentation of the initial segment depending on the IDR frames results in what are essentially mini segments, each having an IDR frame to facilitate video decoding without resorting to other mini segments. Accordingly, such mini segments or fragments may be treated as newer segments during the initial startup period. Regardless of the exact terminology, a modified manifest may be generated that contains location references to the newly generated fragments across all bitrate representations (block 1422), based on which first fragment lengths/durations (e.g., in seconds) may be determined (block 1424) that are provided as an input to the iterative loop process 1426 of FIG. 14B. Also, the modified manifest with respect to the newly generated fragments is further manipulated wherein references to all but one bitrate representation are removed, thereby creating a further modification of the modified manifest (block 1432). As pointed out previously, any single bitrate of the original full ABR manifest may be retained in the further modified manifest for purposes of the present invention, which is provided the requesting ABR client/UE device as a signaling mechanism to suppress the device's bitrate and segment selection capability (block 1434). Where the IDR frame count is not greater than one, the initial segment is not fragmented and may proceed with the remaining process flow, mutatis mutandis, with respect to its delivery Continuing to refer to sub-process 1400B of FIG. 14B, the iterative loop 1426 may be performed across all the bitrates of the sorted manifest. In one embodiment, the iterative loop 1426 receives a playout target time parameter from a policy management component (block 1428). For each bitrate, a Start_Time parameter is determined as a function based on the bitrate indicated in the sorted manifest, current session's allocated bitrate (as per the applicable bandwidth flow control mechanism), the first fragment's length in seconds (determined in block 1424) as well as a configurable device renderer parameter or factor that can vary depending on how soon an ABR client can begin rendering. In one arrangement, it may be assumed that ABR clients can commence rendering after 1.5 fragments have been downloaded, as set forth in the illustrative scenario of block 1430. A determination is made as to whether Start_Time is ≤playout target time in seconds (block 1436). If not, that bitrate is skipped (block 1442). Otherwise, first two mini segments (or fragments) are selected for the current manifest bitrate (block 1438) and the iterative loop may be exited (block 1440) and control is passed on to a delivery sub-process 1400C of FIG. 14C.

Responsive to a segment request for the current streaming session (block 1444), sub-process 1400C involves delivering of a first one of the two selected initial fragments at the selected bitrate representation to the ABR client/UE device (block 1446). Responsive to a further segment request (block 1450), a second one of the two selected initial fragments at the selected bitrate representation is delivered (block 1452). Further, the selected fragments for delivery may be saved as last session delivery fragments as set forth at blocks 1448 and 1454, which information may be used in an additional or alternative embodiment involving fast ABR startup in a continuing ABR session (i.e., after the ABR session has commenced). As skilled artisans will recognize, the foregoing delivery of fragments may be effectuated as part of a selective segment delivery process described in detail hereinabove (block 1456).

Figure 15:
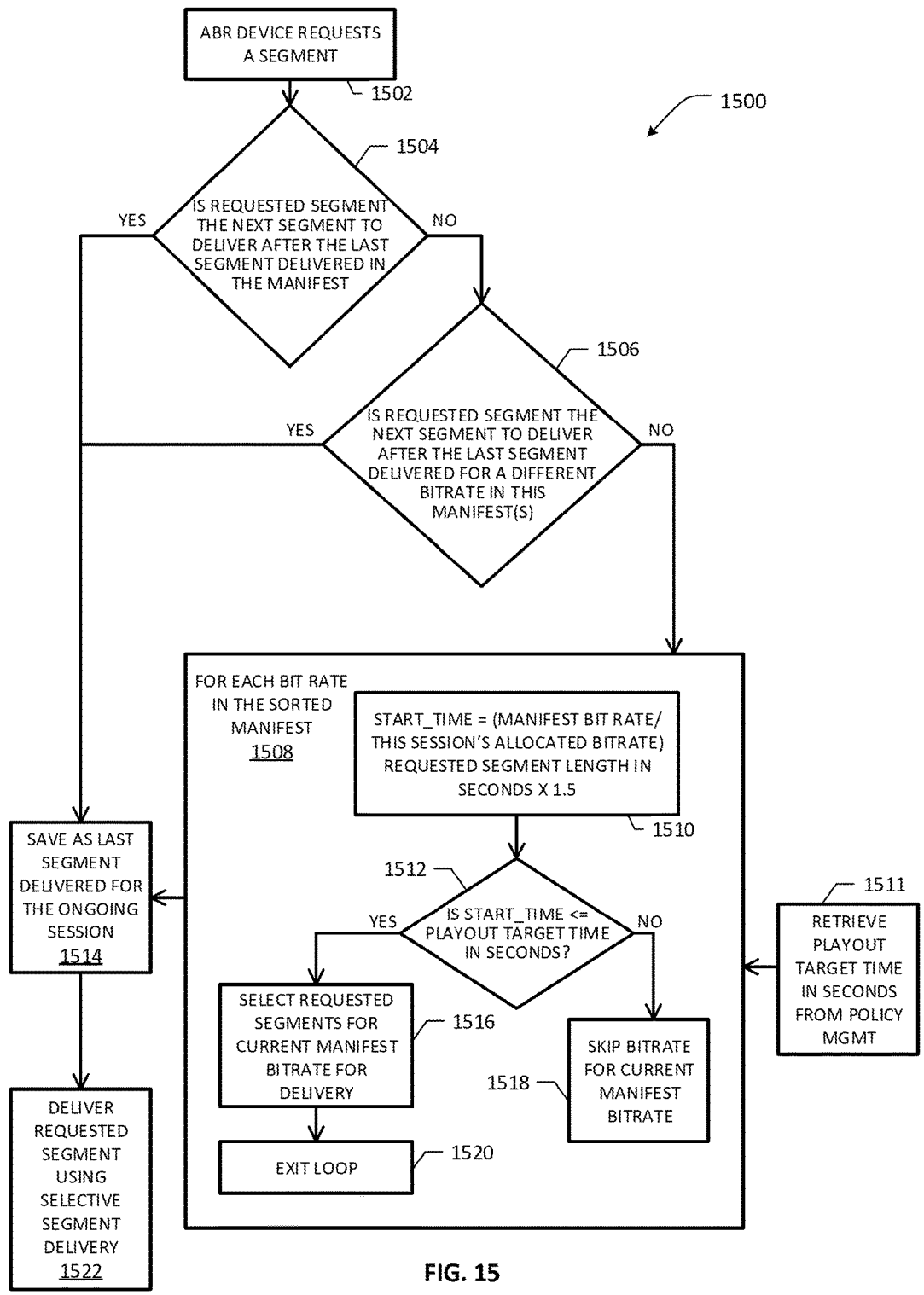
FIG. 15 is a flowchart depicting additional details relative to performing a fast ABR startup using selective ABR segment delivery during an ongoing session.

Turning to FIG. 15, shown therein is a flowchart depicting additional details relative to performing a fast ABR startup using selective ABR segment delivery during an ongoing session. Example process 1500 of FIG. 15 is generally representative of a method for effectuating a fast startup with respect to continued segment delivery when a device is playing an ABR video session and encounters a "trick mode" operation for instance. Skilled artisans will appreciate that this method allows for faster startup when the ABR client device engages in trick mode functionality such as, e.g., fast forwarding or rewinding the ABR video session. Broadly, a key difference here with respect to fast startup at commencing a new session is that no re-segmentation or fragmentation takes place in this embodiment. Since the bitrate definition for the manifest and full playlist manifests (depending on the ABR specification and VOD mode vs. live media) may typically be only downloaded at the initial start of the video session, the manifest retrieval might not allow for adjustment of segment sizes. Accordingly, no modified manifests referencing shorter segments will be generated. As noted previously, the last segment delivered may be used to determine whether the ABR client/UE device is resuming after a fast forward or rewind in the video stream. Essentially, if the current segment requested is a next segment after the last delivered segment in the manifest, it may be surmised that the client device has not experienced a fast forward or rewind. If the requested segment is not the next segment in the video sequence with respect to the previous segment delivered from the manifest, a fast forward or rewind situation is detected or otherwise determined and a selective segment logic may be executed based on the encoded bitrate vs. allocated bandwidth comparison.

More specifically, responsive to receiving a segment request or a message indicative thereof from the ABR client/UE device (block 1502), a determination may be made whether the requested segment is a next segment to deliver after the last segment delivered from the manifest (block 1504). If otherwise, a further determination is made as to the requested segment's bitrate vis-à-vis the last segment's bitrate (block 1506). If either determinations of decision blocks 1504 and 1506 is affirmative, the requested segment is saved as the last segment delivered for the session (block 1514). The requested segment is then delivered using selective segment delivery as before (block 1522). If the determination of decision block 1506 is negative, an iterative loop process 1508 similar to the loop process 1426 may be executed for each bitrate in the manifest. A Start_Time is computed as a function based the bitrate indicated in the sorted manifest, current session's allocated bitrate (as per the applicable bandwidth flow control mechanism), the requested segment length in seconds as well as a configurable device renderer parameter or factor, e.g., 1.5, as set forth at block 1510. A playout target time parameter may also be obtained from a policy management component (block 1511), which may or may not necessarily the same as the initial startup playback target time. A determination is made as to whether Start_Time is ≤playout target time in seconds (block 1512). If not, that bitrate is skipped (block 1518). Otherwise, the bitrate of the manifest is selected for delivery (block 1516), whereupon the iterative loop 1508 may be exited (block 1520) and control is passed on to blocks 1514 and 1522 for delivery of the selected segment as before.

Skilled artisans will appreciate that bandwidth allocation scenarios using selective segment delivery in conjunction with fast ABR startup may be obtained similar to the bandwidth pipe allocation scenarios depicted in FIGS. 11A and 11B and will not be repeated here, except to note that in an example 10-second segment that may be re-fragmented into five 2-second fragments, initial startup times may be computed as approx. 0.12 seconds, 0.12 seconds and 0.48 seconds for the 3-device scenario of FIG. 11A (with weights being 3.0, 3.0 and 0.75, respectively) and approx. 0.18 seconds, 0.18 seconds, 0.44 seconds, 0.44 seconds and 0.53 seconds for the 5-device scenario of FIG. 11B (with weights being 3.0, 3.0, 1.5, 1.5 and 0.75, respectively).

Figure 16:
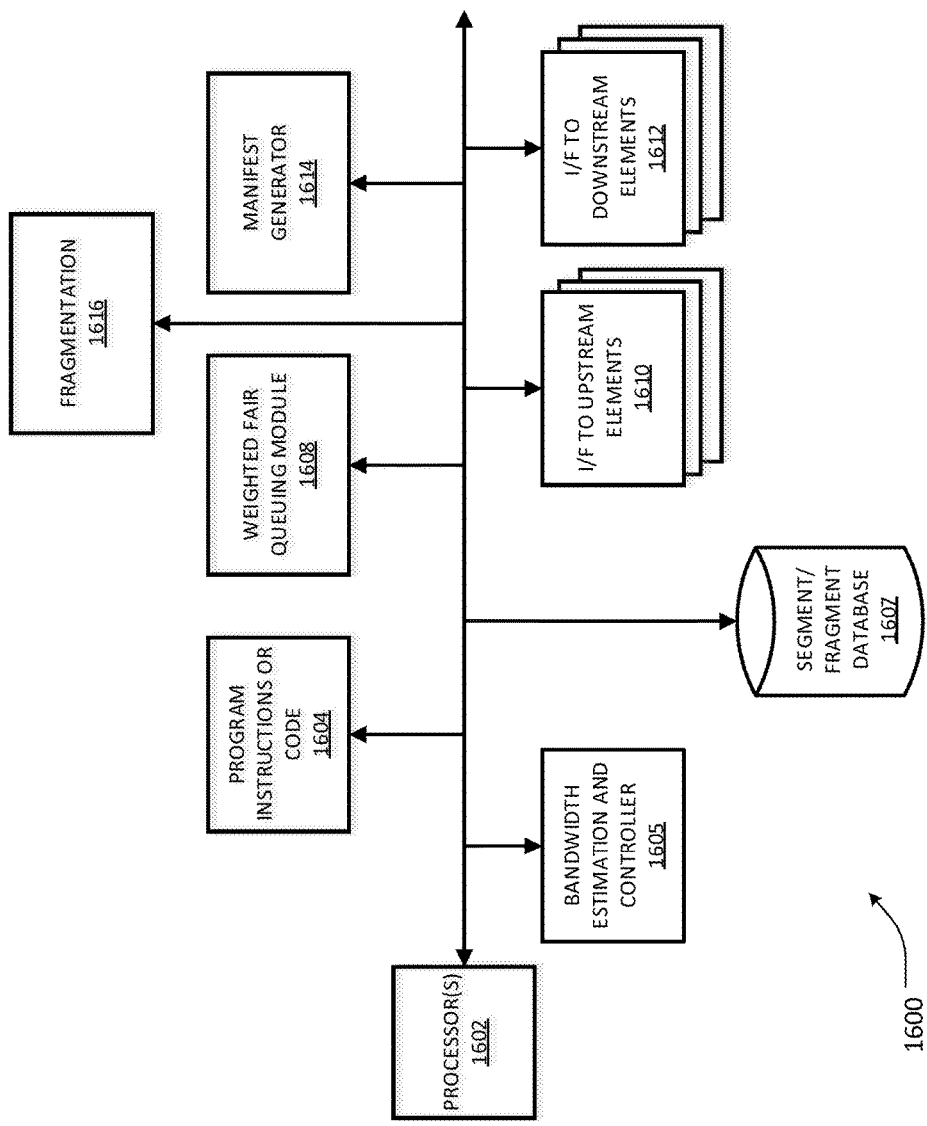
FIG. 16 depicts a block diagram of a computer-implemented apparatus that may be (re)configured and/or (re)arranged as a platform, node or element in an example ABR network architecture according to one or more embodiments of the present patent disclosure.

FIG. 16 depicts a block diagram of a computer-implemented apparatus that may be (re)configured and/or (re)arranged as a node or element in an example ABR network architecture according to one or more embodiments of the present patent disclosure. It should be appreciated that apparatus 1600 may be variously configured to operate as an ABR stream delivery server, bandwidth-managed delivery server, a re-segmentation system, or any combination thereof disposed in association with an edge network or an encoder/segmenter/packager subsystem at suitable upstream network location(s) for implementing one or more embodiments described hereinabove. One or more processors 1602 may be operatively coupled to various modules that may be implemented in persistent memory for executing suitable program instructions or code portions with respect to effectuating selective segment delivery logic, manifest modification/regeneration, segment fragmentation, etc., as exemplified by modules 1604, 1614, 1616. A segment/fragment database 1607 may be provided for storing a plurality of media assets as well as associated metadata files, which may be linked to database records corresponding to individual ABR client devices and their respective streaming sessions. Additional modules such as WFQ flow control module 1608, bandwidth estimation and controller module 1605, and the like may also be provided to facilitate segment delivery and/or bandwidth management processes under suitable program instructions or code 1604 executable by the processors 1602. Where a network edge subsystem includes fast ABR startup delivery logic, such functionality may be also embodied in suitable program instructions or code 1604. Appropriate client-bound downstream interfaces (I/F) 1612 may be provided for facilitating connectivity to various downstream elements such as routers, DSLAMs, CMTS, etc., e.g., configured to effectuate delivery pipes to subscriber premises. Likewise, appropriate interfaces 1610 to various upstream or co-hierarchical network elements and/or databases may be provided depending on a particular network node implementation. For example, in a CDN implementation, such interfaces may include interfaces to one or more edge/regional distribution nodes, or other peer edge delivery nodes, or various policy management nodes, such as subscriber policy management nodes, content/operator policy management nodes, etc., or HTTP content servers, and the like. In a mobile communications network implementation, the interfaces may include interfaces to downstream backhaul network elements, e.g., to base stations, or upstream backhaul network elements, e.g., HTTP content servers, as well as other network elements of a mobile network infrastructure. Accordingly, depending on the context, interfaces selected from interfaces 1610 or interfaces 1612 may sometimes be referred to as a first interface, a second interface, and the like.

Figure 17:
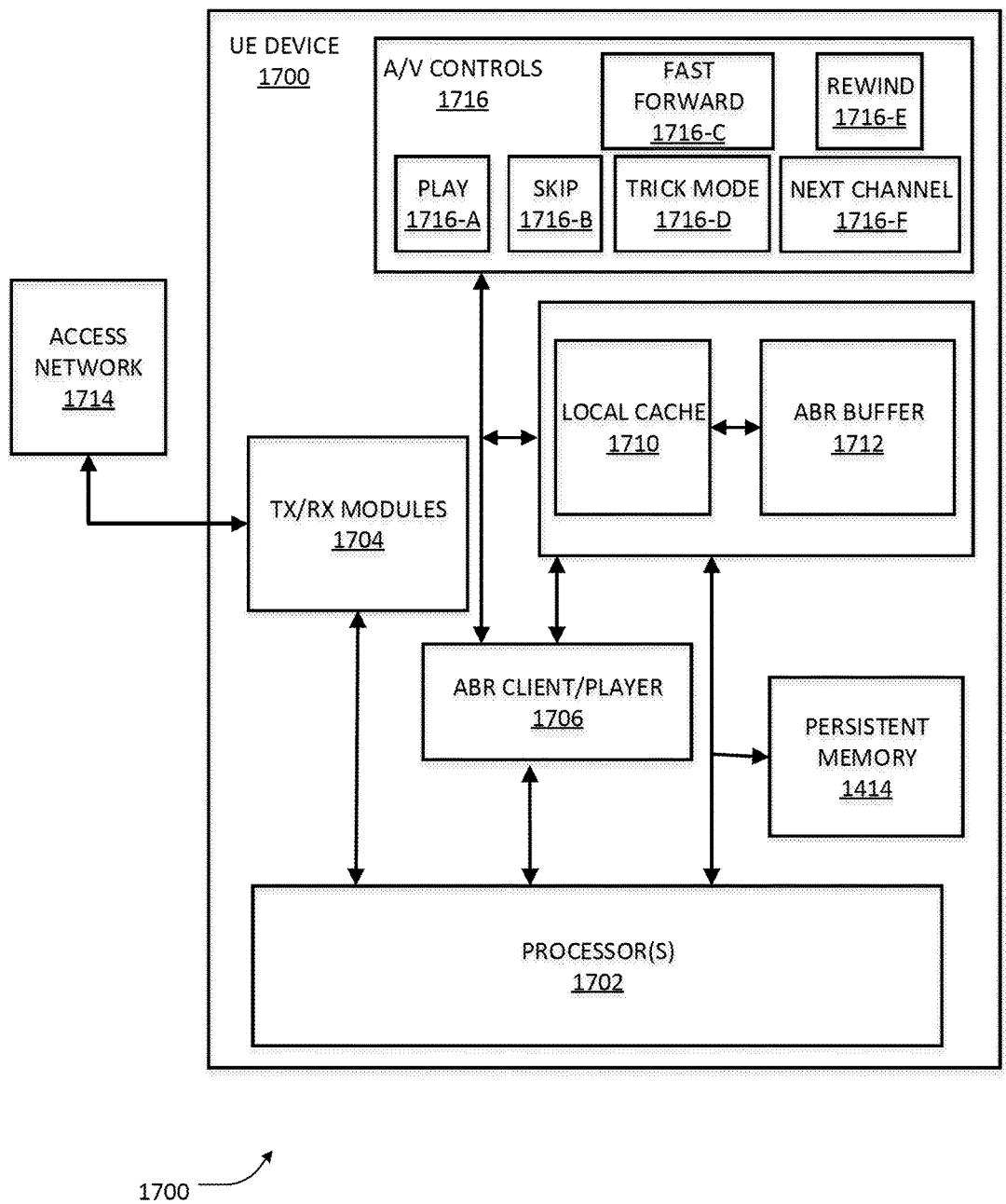
FIG. 17 depicts is a block diagram of an example UE device having an ABR client for purposes of an embodiment of the present patent disclosure.

FIG. 17 depicts is a block diagram of an example UE device 1700 having an ABR client/player 1706, wherein processor(s) 1702 are provided for operating in conjunction with the player 1706 with respect to effectuating streaming and playback control for purposes of an embodiment of the present patent application. Appropriate transceiver (Tx/Rx) circuitry 1704 is operative to effectuate communications via a premises node (e.g., a gateway or cable modem, integrated set-top box, etc.) that connects to a suitable access network 1714 using wired or wireless technologies. The ABR client 1706 is operative to play out segments stored in an ABR buffer 1712, which may be provided with lower quality segments/fragments for fast ABR startup as described above. A local cache 1710 is operative to store preloaded content in certain embodiments.

As illustrated, the ABR client/player 1706 is provided with a plurality of ABR client controls 1716 that may be selectively operated by users for controlling user experience. Such ABR client controls may comprise audio controls as well as video controls available with respect to a streaming session and may include Play 1716-A, Skip 1716-B, Fast Forward 1716-C, Trick Mode or Trick Play 1716-D, Rewind 1716-E, and Next Channel or Channel Change 1716-E. A persistent memory module 1714 may be provided for storing appropriate program code or software instructions that may be executed by processors 1702 for effectuating ABR client control modulation, manifest parsing, suppression of bitrate and segment selection, etc. in conjunction with other modules of the UE device 1700.

Figure 18:
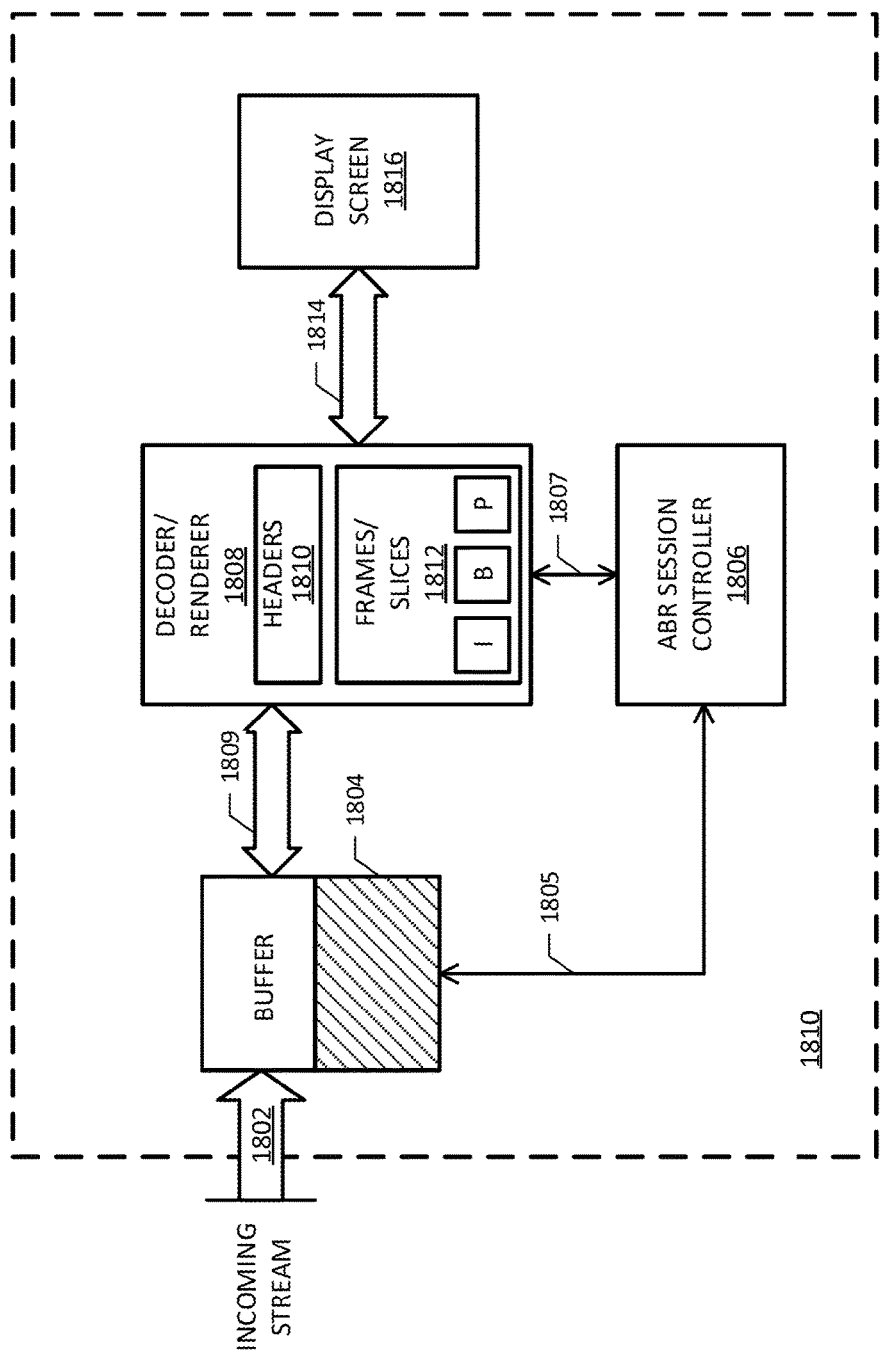
FIG. 18 depicts additional details of a portion of an example UE device having an ABR client for purposes of an embodiment of the present patent disclosure.

FIG. 18 depicts additional details of a portion 1800 of an example UE device (e.g., UE device 1700) having an ABR client for purposes of an embodiment of the present patent disclosure. An ABR session controller 1806 is provided with communication paths 1805, 1807 to intercept, interrupt, or otherwise control the operations relative to a video buffer 1804 that is operative to store an incoming video stream and a decoder/renderer 1808, respectively. The decoder/renderer 1808 is coupled to the video buffer 1804 via a communication path 1809 and to a display screen 1816 via a communication path 1814. Buffer 1804 is preferably provided with segments of a selected single bitrate representation provided via selective segment delivery. Where an embodiment of fast ABR startup is implemented, buffer 1804 holds only partial segments or fragments thereof at a select bitrate representation for an initial starting of a session. After a time period, buffer 1804 transitions from partial segment storage mode to full segment storage mode, as discussed previously. In normal viewing operations, the decoder/renderer 1808 is operative to decode the buffered data when certain levels are achieved/maintained (e.g., after a segment is downloaded). Example decoded data is illustratively shown as header data 1810 and I/B/P frames or slices 1812 that may be provided to the display screen 1816 for forming images thereon. In channel changing conditions and/or other startup conditions, on the other hand, the decoder/renderer 1808 is forced to process the video buffer data even if there is only a minimum amount of data.

One skilled in the art will recognize that various apparatuses and systems with respect to ABR bandwidth management and flow control, SSD functionality, manifest modification and regeneration, as well as the underlying network infrastructures set forth above may be architected in a virtualized environment according to a network function virtualization (NFV) architecture in additional or alternative embodiments of the present patent disclosure. For instance, various physical resources, databases, services, applications and functions executing within an example streaming network of the present application set forth hereinabove may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of hardware/software associated with SSD, fast ABR startup, manifest modification, segment fragmentation, and the like may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for managing bandwidth of a delivery pipe serving a subscriber premises that includes at least one adaptive bitrate (ABR) client device, the method comprising:
   detecting, at a bandwidth management element disposed in one of a content delivery network (CDN) and an edge access network, a request for media segments of a content program in an ABR streaming session with the at least one ABR client device;
   managing the bandwidth of the delivery pipe by applying a flow control mechanism that includes allocating a dedicated bandwidth to the ABR streaming session;
   obtaining a manifest referencing multiple bitrate representations of a media segment requested by the at least one ABR client device;
   identifying a particular bitrate representation of the media segment determined to be within a guard band of the dedicated bandwidth allocated to the ABR streaming session;
   generating a modified manifest by removing references of all but a selected single bitrate representation of the multiple bitrate representations of the media segment from the obtained manifest;
   transmitting the modified manifest referencing the selected single bitrate representation to the at least one ABR client device; and
   regardless of the selected single bitrate representation referenced in the modified manifest, providing the particular bitrate representation of the media segment to the at least one ABR client device in order to provide a highest available bitrate in a managed environment.

2. The method as recited in claim 1, wherein the modified manifest referencing the selected single bitrate representation is operative to disable the at least one ABR client device's functionality to choose a bitrate representation from among a plurality of bitrate representations of the media segments of the content program.

3. The method as recited in claim 1, wherein the dedicated bandwidth allocated to the ABR streaming session is determined based on weighted fair queuing (WFQ) applied as the flow control mechanism to the delivery pipe.

4. The method as recited in claim 1, wherein the dedicated bandwidth allocated to the ABR streaming session is determined based on phantom token-based weighted fair queuing (WFQ) applied as the flow control mechanism to the delivery pipe.

5. The method as recited in claim 4, further comprising receiving a token representative of a phantom payload when the at least one ABR client device enters a sleep phase of a duty cycle associated with its ABR streaming session, wherein the phantom payload is used in bandwidth estimation.

6. The method as recited in claim 1, wherein the guard band of the dedicated bandwidth allocated to the ABR streaming session is determined based on at least one of a network operator policy, a subscriber profile policy, and a content provider policy.

7. The method as recited in claim 1, wherein the flow control mechanism is configured to operate based on at least one of a category of the requested content program, type of the at least one ABR client device, number of ABR client devices of the subscriber premises, weights defined for the ABR client devices, and class/quality of service (CoS/QoS) policies.

8. The method as recited in claim 1, wherein the single bitrate representation of the modified manifest comprises a highest bitrate representation referenced in the manifest obtained from a content provider.

9. The method as recited in claim 1, wherein the single bitrate representation of the modified manifest comprises a lowest bitrate representation referenced in the manifest obtained from a content provider.

10. The method as recited in claim 1, further comprising configuring the flow control mechanism to provide bandwidth allocation for the delivery pipe effectuated over an edge access network associated with at least one of a Digital Subscriber Line (DSL) infrastructure and a Data Over Cable Service Interface Specification (DOCSIS)-compliant Cable Modem Termination System (CMTS) infrastructure.

11. The method as recited in claim 1, wherein the ABR streaming session comprises a new streaming session initiated by the at least one ABR client device.

12. The method as recited in claim 1, wherein the ABR streaming session comprises an ongoing streaming session engaged by the at least one ABR client device.

13. The method as recited in claim 1, wherein the ABR streaming session comprises a streaming session in at least one of HTTP Adaptive Streaming (HAS), HTTP Live Streaming (HLS), HTTP Dynamic Streaming (HDS), Dynamic Adaptive Streaming over HTTP (DASH), and HTTP Smooth Streaming (HSS).

14. An apparatus disposed in one of a content delivery network (CDN) and an edge access network for managing bandwidth of a delivery pipe serving a subscriber premises that includes at least one adaptive bitrate (ABR) client device engaged in an ABR streaming session, the apparatus comprising:
  one or more processors; and
  one or more persistent memory modules coupled to the one or more processors, the persistent memory modules including program instructions which, when executed by the processors, are configured to perform:
    detect, at the apparatus, a request for media segments of a content program in an ABR streaming session with the at least one ABR client device;
    manage the bandwidth of the delivery pipe by applying a flow control mechanism that includes allocating a dedicated bandwidth to the ABR streaming session;
    obtain a manifest referencing multiple bitrate representations of a media segment requested by the at least one ABR client device;
    identify a particular bitrate representation of the media segment determined to be within a guard band of the dedicated bandwidth allocated to the ABR streaming session;
    generate a modified manifest by removing references of all but a selected single bitrate representation of the multiple bitrate representations of the media segment from the obtained manifest;
    transmit the modified manifest referencing the selected single bitrate representation to the at least one ABR client device; and
    provide the particular bitrate representation of the media segment to the at least one ABR client device regardless of the selected single bitrate representation referenced in the modified manifest in order to provide a highest available bitrate in a managed environment.

15. The apparatus as recited in claim 14, further comprising a weighted fair queuing (WFQ) module operative as the flow control mechanism with respect to allocating bandwidth of the delivery pipe to one or more streaming sessions.

16. The apparatus as recited in claim 14, further comprising a phantom token-based weighted fair queuing (WFQ) module operative as the flow control mechanism with respect to allocating bandwidth of the delivery pipe to one or more streaming sessions, wherein a token representative of a phantom payload is obtained when the at least one ABR client device enters a sleep phase of a duty cycle associated with its ABR streaming session, the phantom payload containing an amount of packets used in bandwidth estimation.

17. The apparatus as recited in claim 14, wherein the flow control mechanism is configured to operate based on at least one of a category of the requested content program, type of the at least one ABR client device, number of ABR client devices of the subscriber premises, weights defined for the ABR client devices, and class/quality of service (CoS/QoS) policies.

18. The apparatus as recited in claim 14, wherein the single bitrate representation of the modified manifest comprises a highest bitrate representation referenced in the manifest obtained from a content provider.

19. The apparatus as recited in claim 14, wherein the single bitrate representation of the modified manifest comprises a lowest bitrate representation referenced in the manifest obtained from a content provider.

20. The apparatus as recited in claim 14, further comprising a network interface for effectuating the delivery pipe over an edge access network associated with at least one of a Digital Subscriber Line (DSL) infrastructure and a Data Over Cable Service Interface Specification (DOCSIS)-compliant Cable Modem Termination System (CMTS) infrastructure.

21. The apparatus as recited in claim 14, wherein the ABR streaming session comprises one of a new streaming session initiated by the at least one ABR client device and an ongoing streaming session engaged by the at least one ABR client device, and further wherein the ABR streaming session comprises a streaming session in at least one of HTTP Adaptive Streaming (HAS), HTTP Live Streaming (HLS), HTTP Dynamic Streaming (HDS), Dynamic Adaptive Streaming over HTTP (DASH), and HTTP Smooth Streaming (HSS).

* * * * *